US 9,864,741 B2

(12) United States Patent
Mahmud et al.

(10) Patent No.: US 9,864,741 B2
(45) Date of Patent: Jan. 9, 2018

(54) AUTOMATED COLLECTIVE TERM AND PHRASE INDEX

(71) Applicant: Prysm, Inc., San Jose, CA (US)

(72) Inventors: Gazi Mahmud, Berkeley, CA (US); Seenu Banda, San Francisco, CA (US); Deanna Liang, San Francisco, CA (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 14/862,621

(22) Filed: Sep. 23, 2015

(65) Prior Publication Data

US 2016/0085742 A1    Mar. 24, 2016

Related U.S. Application Data

(60) Provisional application No. 62/054,335, filed on Sep. 23, 2014.

(51) Int. Cl.
*G06F 17/27* (2006.01)
*G06F 17/21* (2006.01)

(52) U.S. Cl.
CPC ...... *G06F 17/2735* (2013.01); *G06F 17/2775* (2013.01)

(58) Field of Classification Search
CPC ..... G10L 15/183; G10L 15/197; G10L 15/26; G10L 15/063; G06F 17/2735; G06F 17/2775; G06F 17/271; G06F 17/28; G06F 17/30684

See application file for complete search history.

(56) References Cited

U.S. PATENT DOCUMENTS

| 5,839,106 A * | 11/1998 | Bellegarda ......... G10L 15/1815 704/243 |
| 6,675,159 B1 * | 1/2004 | Lin ..................... G06F 17/2705 |
| 6,728,707 B1 | 4/2004 | Wakefield et al. |
| 7,031,908 B1 * | 4/2006 | Huang ................. G10L 15/1815 704/9 |
| 7,197,449 B2 * | 3/2007 | Hu ...................... G06F 17/2755 704/1 |

(Continued)

OTHER PUBLICATIONS

EMC Corporation. (Jan. 2008). "EMC Documentum Architecture: Delivering the Foundations and Services for Managing Content Across the Enterprise, A Detailed Review." White Paper, part No. H3411, 36 pages.

(Continued)

*Primary Examiner* — Edgar Guerra-Erazo
(74) *Attorney, Agent, or Firm* — Kilpatrick Townsend & Stockton LLP

(57) ABSTRACT

Knowledge automation techniques may include selecting a knowledge element from a knowledge corpus of an enterprise for extraction of n-grams, and deriving a term vector comprising terms in the knowledge element. Based at least on a frequency of occurrence of each term in the knowledge element, key terms are identified in the term vector. Thereafter, the identified key terms are used to extract one or more n-grams from the knowledge element. Each of the extracted n-grams is scored as a function of at least a frequency of occurrence of each of the n-grams across the knowledge corpus of the enterprise, and based on the scoring, one or more of the n-grams is added to a collective term and phrase index.

20 Claims, 14 Drawing Sheets

(56) References Cited

U.S. PATENT DOCUMENTS

| | | | | |
|---|---|---|---|---|
| 7,359,851 | B2* | 4/2008 | Tong | G06F 17/218 704/8 |
| 7,487,094 | B1* | 2/2009 | Konig | G10L 15/19 379/88.01 |
| 7,567,959 | B2* | 7/2009 | Patterson | G06F 17/30616 |
| 7,877,258 | B1* | 1/2011 | Chelba | G06F 17/2715 704/240 |
| 7,983,902 | B2* | 7/2011 | Wu | G06F 17/2745 704/1 |
| 8,352,245 | B1* | 1/2013 | Lloyd | G10L 15/183 704/9 |
| 8,543,398 | B1* | 9/2013 | Strope | G10L 15/063 704/235 |
| 8,554,559 | B1* | 10/2013 | Aleksic | G10L 15/30 704/235 |
| 8,712,776 | B2* | 4/2014 | Bellegarda | G10L 13/08 704/258 |
| 2003/0083862 | A1* | 5/2003 | Hu | G06F 17/2755 704/9 |
| 2004/0044952 | A1* | 3/2004 | Jiang | G06F 17/30616 715/256 |
| 2005/0154578 | A1* | 7/2005 | Tong | G06F 17/218 704/5 |
| 2005/0171761 | A1* | 8/2005 | Ju | G10L 15/18 704/10 |
| 2006/0053015 | A1* | 3/2006 | Lai | G10L 15/197 704/257 |
| 2006/0106792 | A1* | 5/2006 | Patterson | G06F 17/30616 |
| 2007/0127688 | A1* | 6/2007 | Doulton | G10L 15/265 379/265.01 |
| 2008/0162117 | A1* | 7/2008 | Bangalore | G06F 17/2818 704/10 |
| 2011/0093414 | A1* | 4/2011 | Xu | G06F 17/27 706/12 |
| 2012/0029910 | A1* | 2/2012 | Medlock | G06F 3/0237 704/9 |
| 2012/0254917 | A1 | 10/2012 | Burkitt et al. | |
| 2012/0296845 | A1 | 11/2012 | Andrews et al. | |
| 2016/0042298 | A1* | 2/2016 | Liang | G06F 3/04817 706/12 |
| 2016/0085389 | A1* | 3/2016 | Mahmud | G06F 17/30 715/838 |
| 2016/0085742 | A1* | 3/2016 | Mahmud | G06F 17/2775 704/9 |
| 2016/0085758 | A1* | 3/2016 | Mahmud | G06F 17/30867 707/733 |

OTHER PUBLICATIONS

Stefik, M. et al. (Revised by JF on Mar. 7, 2002). "The Knowledge Sharing Challenge." The Sensemaking White Paper, 110 pages.

Madcap Software "Creating Auto-Indexes," located at <http://webhelp.madcapsoftware.com/flare6/Content/Indexes/Creating_Auto_Indexes.htm>, last visited on Sep. 22, 2015, 3 pages.

Johnson, G. (Apr. 9, 2008). "Microsoft Word—Creating an Index Automatically Using a Concordance," located at <http://www.resourcesforlife.com/docs/item610>, last visited on Sep. 22, 2015, 5 pages.

Zhai, C. (Mar. 31, 1997). "Fast Statistical Parsing of Noun Phrases for Document Indexing," *ANLC '97 Proceedings of the Fifth Conference on Applied Natural Language Processing*, pp. 312-319.

Medelyan, O. et al. (2005). "Thesaurus-Based Index Term Extraction for Agricultural Documents," Department of Computer Science, The University of Waikato, Private Bag 3105, Hamilton, New Zealand, located at <http://citeseerx.ist.psu.edu/viewdoc/summary?doi=10.1.1.76.7928>, last visited on Sep. 22, 2015, 8 pages.

SAS Institute Inc. (2013). "SAS® Enterprise Content Categorization," located at <https://www.sas.com/content/dam/SAS/en_us/doc/factsheet/sas-enterprise-content-categorization-104366.pdf>, last visited on Sep. 22, 2015, 4 pages.

Cynapse. "Collaborative Applications," located at <http://www.cynapse.com/cyn-in/features>, last visited on Sep. 22, 2015, 25 pages.

IBM Software (Jun. 2012). "IBM Content Analytics with Enterprise Search, Version 3.0." 8 pages.

BMC Sofware (Dec. 2007). "BMC Remedy Knowledge Management 7.2—Planning and Configuration Guide," 154 pages.

* cited by examiner

N-GRAM GENERATOR 1100

FREQUENTLY OCCURRING TERM IDENTIFIER 1110

N-GRAM EXTRACTOR 1112

FIG. 11

Mark Twain ~~was~~ fascinated ~~with~~ science ~~and~~ scientific inquiry. He developed ~~a~~ close ~~and~~ lasting friendship ~~with~~ Nikola Tesla, ~~and the~~ two spent much time together ~~in~~ Tesla's laboratory... Twain's writings ~~and~~ lectures, ~~combined with the~~ help ~~of a~~ new friend, enabled him ~~to~~ recover financially.
1210

K-Unit (1) = (Mark, Twain, fascinated, science, scientific, inquiry, He (Mark Twain), developed, close, lasting, friendship, Nikola, Tesla, two, spent, much, time, together, Tesla's, laboratory... "Twain's (Twain), writings, lectures, help, new, friend, enabled, him (Mark Twain), recover, financially)
1212

Key Terms =
Mark (1)
Twain (5)
Science (3)
Scientific (1)
Inquiry (1)
Lasting (1)
Friendship (2)
Nikola (3)
Tesla (3)
Time (6)
Tesla's (1)
Laboratory (1)...
1214

FIG. 12

Mark Twain ~~was~~ fascinated ~~with~~ science ~~and~~ scientific inquiry. He developed a close ~~and~~ lasting friendship ~~with~~ Nikola Tesla, ~~and the~~ two spent much time together ~~in~~ Tesla's laboratory... Twain's writings ~~and~~ lectures, ~~combined with the~~ help ~~of a~~ new friend, enabled him ~~to~~ recover financially.

1310

---

Extracted N-Grams =
1.) Twain (5)
    a.) Mark Twain (1)
2.) Science (3)
3.) Scientific (1)
    a.) Scientific Inquiry (1)
4.) Lasting Friendship (1)
5.) Nikola Tesla (3)
6.) Tesla's Laboratory (1)
7.) Writings Lectures (1)
8.) Financially (4)
    a.) Recover Financially (1)

AUTOMATED COLLECTIVE TERM AND PHRASE INDEX

CROSS-REFERENCES TO RELATED APPLICATIONS

The present application is a non-provisional of and claims the benefit and priority of U.S. Provisional Application No. 62/054,335, filed Sep. 23, 2014, entitled "Automated Collective Word and Phrase Index," the entire contents of which are incorporated herein by reference for all purposes.

BACKGROUND

The present disclosure generally relates to knowledge automation. More particularly, techniques are disclosed for the automatic generation of a collective term and phrase index from data content across an enterprise.

Currently, term and phrase indices (commonly referred to as dictionaries) can be generated for a user's local content. The term and phrase indices are typically user and application specific (e.g., a user's dictionary for one application is different from the same user's dictionary for a different application). For example, an individual using a word processor has an instance of a list of words such as a dictionary associated with that user and with that word processor. The dictionary is not shared across multiple enterprise applications or across multiple users. Another example is a file repository with a search facility. The file repository may maintain an index of words used by files in the repository. However, such an index is not based on collective content from the entire enterprise, but is instead limited and specific to only those files included in that specific repository. Furthermore, such an index is not shared with other applications or repositories.

Embodiments of the present invention address these and other problems individually and collectively.

BRIEF SUMMARY

Techniques are disclosed for the automatic generation of a collective term and phrase index from data content across an enterprise. In some embodiments, a method is disclosed comprising selecting, by a computing system, a knowledge element from a knowledge corpus of an enterprise for extraction of n-grams, deriving, by a computing system, a term vector comprising terms in the knowledge element, identifying, by the computing system, key terms in the term vector based at least on a frequency of occurrence of each term in the knowledge element, extracting, by the computing system, n-grams using the identified key terms, scoring, by the computing system, each of the extracted n-grams as a function of at least a frequency of occurrence of each of the n-grams across the knowledge corpus of the enterprise, and adding, by the computing system, one or more of the extracted n-grams to an index based on the scoring.

Optionally, extracting the one or more n-grams using the identified key terms includes identifying one or more terms adjacent to each key term in the knowledge element, performing natural language processing on the one or more terms adjacent to each key term and the key terms, calculating a probability of the one or more terms adjacent to each key term in the knowledge element as preceding or following the key term based on a function of the natural language processing, when the probability of the one or more terms being adjacent to the key term is greater than minimum threshold probability, extracting an n-gram comprising the one or more terms and the key term, and when the probability of the one or more terms being adjacent to the key term is less than the minimum threshold probability, extracting an n-gram comprising only the key term.

In some embodiments, a non-transitory computer-readable storage memory storing a plurality of instructions executable by one or more processors is disclosed, the plurality of instructions comprising instructions that cause the one or more processors to select a knowledge element from a knowledge corpus of an enterprise for extraction of n-grams, instructions that cause the one or more processors to identify key terms in a term vector associated with the knowledge element based at least on a frequency of occurrence of each term in the knowledge element, instructions that cause the one or more processors to calculate a probability of one or more terms adjacent to each key term in the knowledge element as preceding or following the key term based on a function of natural language processing, instructions that cause the one or more processors to extract an n-gram comprising the one or more terms and the key term when the probability of the one or more terms being adjacent to the key term is greater than a minimum threshold probability, instructions that cause the one or more processors to extract an n-gram comprising only the key term when the probability of the one or more terms being adjacent to the key term is less than the minimum threshold probability, instructions that cause the one or more processors to score each of the extracted n-grams as a function of at least a frequency of occurrence of each of the n-grams across the knowledge corpus of the enterprise, and instructions that cause the one or more processors to add one or more of the extracted n-grams to an index based on the scoring.

In some embodiments, a system is disclosed comprising one or more processors, and a memory coupled with and readable by the one or more processors, the memory configured to store a set of instructions which, when executed by the one or more processors, causes the one or more processors to select a knowledge element from a knowledge corpus of an enterprise for extraction of n-grams, derive a term vector comprising terms in the knowledge element, identify key terms in the term vector based at least on a frequency of occurrence of each term in the knowledge element, extract n-grams using the identified key terms, score each of the extracted n-grams as a function of at least a frequency of occurrence of each of the n-grams across the knowledge corpus of the enterprise, and add one or more of the extracted n-grams to an index based on the scoring.

BRIEF DESCRIPTION OF THE DRAWINGS

FIG. 11 illustrates a block diagram of an n-gram generator, according to some embodiments.

FIG. 12 illustrates a conceptual diagram of key term identification, according to some embodiments.

FIG. 13 illustrates a conceptual diagram of n-gram extraction, according to some embodiments.

DETAILED DESCRIPTION

Figure 1:
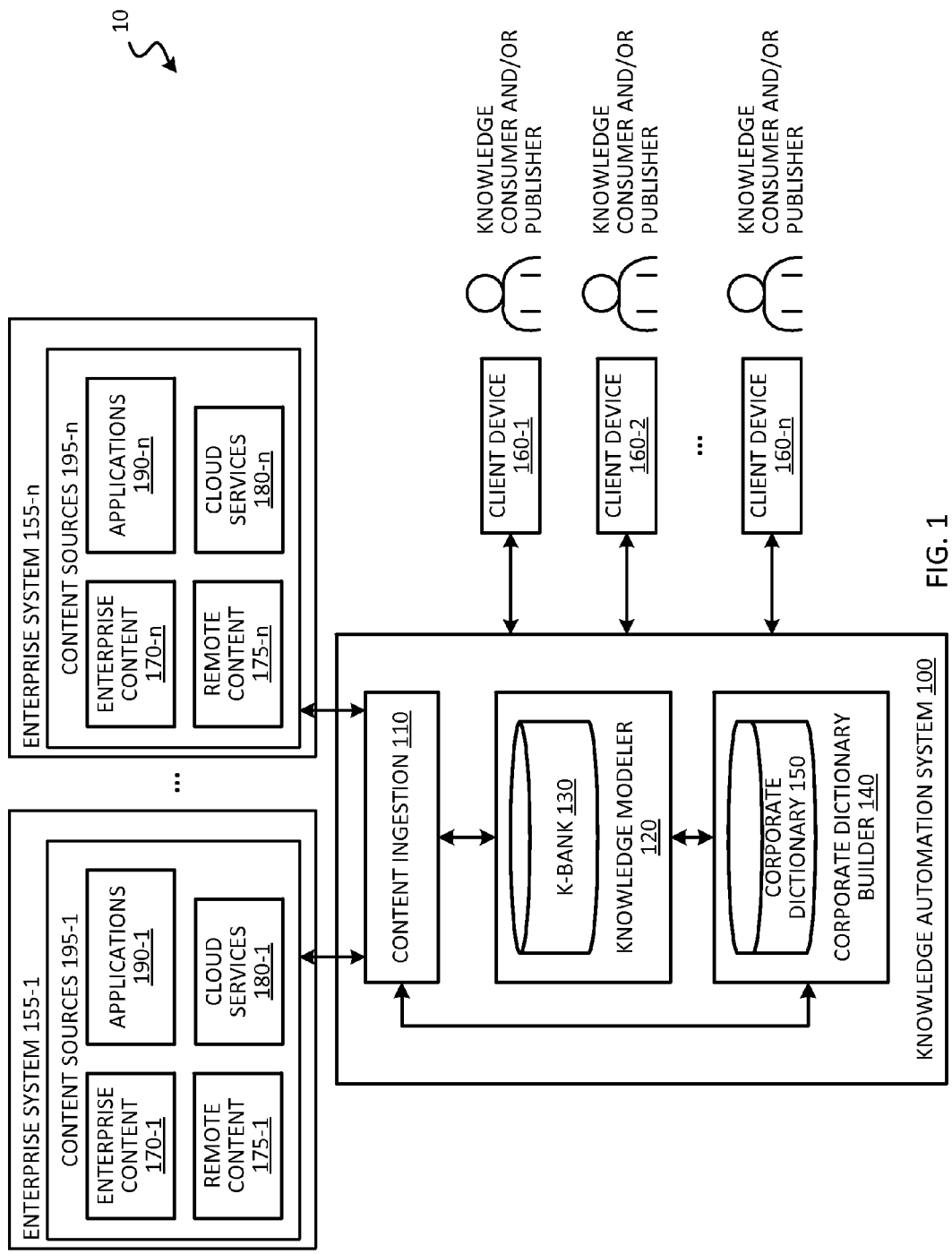
FIG. 1 illustrates an environment in which a knowledge automation system can be implemented, according to some embodiments.

The present disclosure relates generally to knowledge automation. Certain techniques are disclosed for the automatic generation of a collective term and phrase index (also referred to herein as a "dictionary", "corporate dictionary", or "index") from data content across an enterprise. A corporate dictionary is a set of terms and phrases (e.g., n-grams) that identify knowledge content within one or more knowledge elements (e.g., knowledge units and knowledge packs) accessible by users. The entire set of terms and phrases represents a controlled vocabulary of the knowledge content across the enterprise. Techniques are disclosed for analyzing the knowledge content across the enterprise and collecting terms and phrases from the analyzed knowledge content to generate the corporate dictionary for the enterprise. Techniques are also disclosed to regularly and automatically update (e.g., add and remove) the terms and phrases based on changes to the knowledge content (e.g., as knowledge content is added or removed). Techniques are also disclosed for the corporate dictionary to be used enterprise-wide such that the corporate dictionary represents and can be used by an entire enterprise and not merely one repository or user.

Substantial amounts of data (e.g., data files such as documents, emails, images, code, and other content, etc.) may be available to users in an enterprise. These users may rely on information contained in the data to assist them in performing their tasks. The users may also rely on information contained in the data to generate useful knowledge that is consumed by other users. For example, a team of users may take technical specifications related to a new product release, and generate a set of training materials for the technicians who will install the new product. However, unique vocabulary for a new product and large quantities of data available to these users may make it difficult to understand and identify the right information to use.

Machine learning techniques can analyze content at scale (e.g., enterprise-wide and beyond) and identify terms and phrases that best identify the knowledge content. Machine learning can be used to model both the data content accessible by each enterprise system (e.g., local storage, remote storage, and cloud storage services, such as SharePoint, Google Drive, Box, etc.), and generate a sub-collection of terms and phrases that best represent the model of the data content. For example, a new product release may introduce new terms and phrases which may replace or complement existing terms and phrases. The new terms and phrases may be identified and added to the corporate dictionary. Each term and phrase added to the corporate dictionary can include links back to the knowledge content from which the terms and phrases were identified. In this manner, users can search, view, and sort terms and phrases commonly used in the enterprise, and access the knowledge content from which the terms and phrases were identified. This not only provides a structure and organization to the corporate dictionary that simplifies search and review of the terms and phrases and the knowledge content from which the terms and phrases were identified, but also improves the efficiency of computing systems by freeing up computing resources that would otherwise be consumed by efforts to search and locate the right knowledge content, and allowing these computing resources to be allocated for other tasks.

I. Architecture Overview

FIG. 1 illustrates an environment 10 in which a knowledge automation system 100 can be implemented across an entire enterprise, according to some embodiments. As shown in FIG. 1, a number of client devices 160-1, 160-2, . . . 160-$n$ can be used by a number of users to access services provided by knowledge automation system 100. The client devices may be of various different types, including, but not limited to personal computers, desktops, mobile or handheld devices such as laptops, smart phones, tablets, etc., and other types of devices. Each of the users can be a knowledge consumer who accesses knowledge from knowledge automation system 100, or a knowledge publisher who publishes or generates knowledge in knowledge automation system 100 for consumption by other users. In some embodiments, a user can be both a knowledge consumer and a knowledge publisher, and a knowledge consumer or a knowledge publisher may refer to a single user or a user group that includes multiple users.

Knowledge automation system 100 can be implemented as a data processing system, and may discover and analyze content from one or more content sources 195-1 . . . 195-$n$ used by one or more enterprise systems 155-1 . . . 155-$n$ and stored in one or more data repositories, such as a databases, file systems, management systems, email servers, object stores, and/or other repositories or data stores. In some embodiments, client devices 160-1, 160-2, . . . 160-$n$ can access the services provided by knowledge automation system 100 through a network such as the Internet, a wide area network (WAN), a local area network (LAN), an Ethernet network, a public or private network, a wired network, a wireless network, or a combination thereof. Content sources 195-1 . . . 195-$n$ may include enterprise content 170-1 . . . 170-$n$ maintained by enterprise systems 155-1 . . . 155-$n$, remote content 175-1 . . . 175-$n$ maintained at one or more remote locations (e.g., the Internet), cloud services content 180-1 . . . 180-$n$ maintained by cloud storage service providers, applications maintained and used by one or more users of enterprise systems 155-1 . . . 155-$n$, etc. Content sources 195-1 . . . 195-$n$ can be accessible to knowledge automation system 100 through a local interface, or through a network interface connecting knowledge automation system 100 to the content sources via one or more of the networks described above. In some embodiments, one or more of the enterprise systems 155-1 . . . 155-$n$, one or more of the content sources 195-1 . . . 195-$n$, one or more of the client devices 160-1, 160-2, . . . 160-$n$, and knowledge automation system 100 can be part of the same network, or can be part of different networks.

Each client device can request and receive knowledge automation services from knowledge automation system 100. Knowledge automation system 100 may include various software applications that provide knowledge-based services to the client devices. In some embodiments, the client devices can access knowledge automation system 100 through a thin client or web browser executing on each client device. Such software as a service (SaaS) models allow multiple different clients (e.g., clients corresponding to different customer entities) to receive services provided by the software applications without installing, hosting, and maintaining the software themselves on the client device.

Knowledge automation system 100 may include a content ingestion module 110, a knowledge modeler 120, and a corporate dictionary builder 140, which collectively may extract information from data content accessible from content sources 195-1 . . . 195-n, derive knowledge from the extracted information, extract terms and phrases from the data content and derived knowledge, and derive one or more n-grams from the extracted terms and phrases. Knowledge automation system 100 can provide a number of knowledge services based on the ingested content. For example, a corporate dictionary can automatically be generated, maintained, and shared among users in the enterprise. In some embodiments, the knowledge automation system 100 may enable administrators, managers, employees, and other users of an enterprise to view, search, and sort terms and phrases commonly used in the enterprise. For example, a user can filter the corporate dictionary to include the top number of terms or phrases used across the enterprise. In some embodiments, the terms or phrases can be sorted by frequency (e.g., how often the terms appear in the data content or knowledge elements). In some embodiments, the term or phrase frequency can be tracked over time, enabling users to view how the commonly used terms of an enterprise have changed over time. For example, a new product release may introduce new terms and phrases which may replace or complement existing terms and phrases. In some embodiments, terminology changes over time can be displayed visually (e.g., as varying sized clusters, bubbles, or other visualization).

Content ingestion module 110 can identify and analyze enterprise content 170-1 . . . 170-n (e.g., files and documents, other data such as e-mails, web pages, enterprise records, code, etc. maintained by the enterprise), remote content 175-1 . . . 175-n (e.g., files, documents, and other data, etc. stored in remote databases), cloud services content 180-1 . . . 180-n (e.g., files, documents, and other data, etc. accessible form the cloud), applications (e.g., programs, or groups of programs developed for users of enterprise systems 155-1 . . . 155-n) and/or content from other sources. For example, content ingestion module 110 may crawl or mine one or more of the content sources to identify the content stored therein, and/or monitor the content sources to identify content as they are being modified or added to the content sources. Content ingestion module 110 may parse and synthesize the content to identify the information contained in the content and the relationships of such information. n some embodiments, ingestion can include normalizing the content into a common format, and storing the content as one or more knowledge units in a knowledge bank 140 (e.g., a knowledge data store). In some embodiments, content can be divided into one or more portions during ingestion. For example, a new product manual may describe a number of new features associated with a new product launch. During ingestion, those portions of the product manual directed to the new features may be extracted from the manual and stored as separate knowledge units. These knowledge units can be tagged or otherwise be associated with metadata that can be used to indicate that these knowledge units are related to the new product features. In some embodiments, content ingestion module 110 may also perform access control mapping to restrict certain users from being able to access certain knowledge units.

Knowledge modeler 120 may analyze the knowledge units generated by content ingestion module 110, and combine or group knowledge units together to form knowledge packs. A knowledge pack may include various related knowledge units (e.g., several knowledge units related to a new product launch can be combined into a new product knowledge pack). In some embodiments, a knowledge pack can be formed by combining other knowledge packs, or a mixture of knowledge unit(s) and knowledge pack(s). The knowledge packs can be stored in knowledge bank 130 together with the knowledge units, or stored separately. Knowledge modeler 120 may automatically generate knowledge packs by analyzing the topics covered by each knowledge unit, and combining knowledge units covering a similar topic into a knowledge pack. In some embodiments, knowledge modeler 120 may allow a user (e.g., a knowledge publisher) to build custom knowledge packs, and to publish custom knowledge packs for consumption by other users.

Corporate dictionary builder 140 may analyze knowledge elements (e.g., knowledge units and knowledge packs) to identify terms or unigrams contained within the knowledge elements. By analyzing the knowledge elements, corporate dictionary builder 140 can extract the frequently occurring key terms or unigrams and build n-grams (e.g., terms and phrases) from the frequently occurring key terms or unigrams, score the n-grams based on one or more of recency, frequency, and commonality of the n-grams across the knowledge elements, and add the n-grams to the corporate dictionary 150 based on the score. Each n-gram in the corporate dictionary can link to various locations within the knowledge elements that include that n-gram. For example, when the n-gram is selected, a link can open the corresponding knowledge element to a location in the knowledge element where the n-gram appears. In some embodiments, an overlay or other graphical user interface can be displayed which shows an excerpt of the portion of the knowledge artifact where the n-gram appears. The overlay can include a link that opens the full knowledge artifact. As such, the corporate dictionary 150 serves as a centralized hub for key-words and key-phrases used by the enterprise.

Figure 2:
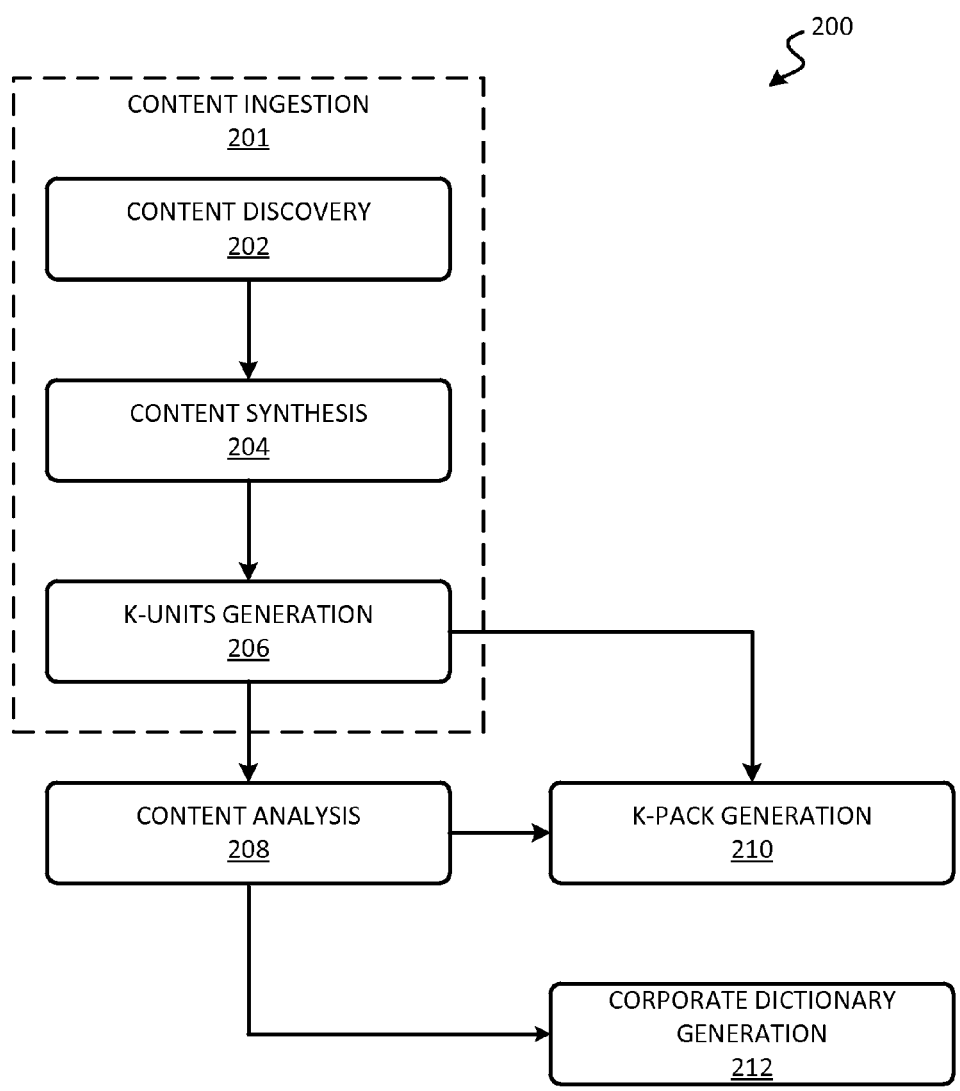
FIG. 2 illustrates a flow diagram depicting some of the processing that can be performed by a knowledge automation system, according to some embodiments.

FIG. 2 illustrates a simplified flow diagram 200 depicting some of the processing that can be performed, for example, by a knowledge automation system, according to some embodiments. The processing depicted in FIG. 2 may be implemented in software (e.g., code, instructions, program) executed by one or more processing units (e.g., processors, cores), hardware, or combinations thereof. The software may be stored in memory (e.g., on a non-transitory computer-readable storage medium such as a memory device).

The processing illustrated in flow diagram 200 may begin with content ingestion 201. Content ingestion 201 may include content discovery 202, content synthesis 204, and knowledge units generation 206. Content ingestion 201 can be initiated at block 202 by performing content discovery to identify and discover data content (e.g., data files) at one or more data sources such as one or more data repositories. At block 204, content synthesis is performed on the discovered data content to identify information contained in the content. The content synthesis may analyze text, patterns, and metadata variables of the data content.

At block 206, knowledge units are generated from the data content based on the synthesized content. Each knowledge unit may represent a chunk of information that covers one or more related subjects. The knowledge units can be of varying sizes. For example, each knowledge unit may correspond to a portion of a data file (e.g., a section of a document) or to an entire data file (e.g., an entire document, an image, etc.). In some embodiments, multiple portions of data files or multiple data files can also be merged to generate a knowledge unit. By way of example, if an entire document is focused on a particular subject, a knowledge unit corresponding to the entire document can be generated. If different sections of a document are focused on different subjects, then different knowledge units can be generated from the different sections of the document. A single document may also result in both a knowledge unit generated for the entire document as well as knowledge units generated for individual portions of the document. As another example, various email threads relating to a common subject can be merged into a knowledge unit. The generated knowledge units are then indexed and stored in a searchable knowledge bank.

At block 208, content analysis is performed on the knowledge units. The content analysis may include performing semantics and linguistics analyses and/or contextual analysis on the knowledge units to infer concepts and topics covered by the knowledge units. Key terms (e.g., keywords) can be extracted, and each knowledge unit can be associated with a term vector of key terms representing the content of the knowledge unit. In some embodiments, named entities can be identified from the extracted key terms. Examples of named entities may include place names, people's names, phone numbers, social security numbers, business names, dates and time values, etc. Knowledge units covering similar concepts can be clustered, categorized, and tagged as pertaining to a particular topic or topics.

At block 210, knowledge packs are generated from individual knowledge units. The knowledge packs can be automatically generated by combining knowledge units based on similarity mapping of key terms, topics, concepts, metadata such as authors, etc. In some embodiments, a knowledge publisher can also access the knowledge units generated at block 206 to build custom knowledge packs. A knowledge map representing relationships between the knowledge packs can also be generated to provide a graphical representation of the knowledge corpus in an enterprise.

At block 212, n-grams are derived based on the knowledge analysis to generate a corporate dictionary identifying key terms and how the key terms are used within an enterprise. The n-grams can be automatically derived from unigrams within a term vector representing the content of a knowledge unit and/or knowledge pack. The derived n-grams are scored based on recency, frequency, and commonality across the knowledge corpus, and the n-grams are added to the corporate dictionary based on the score.

Figure 3:
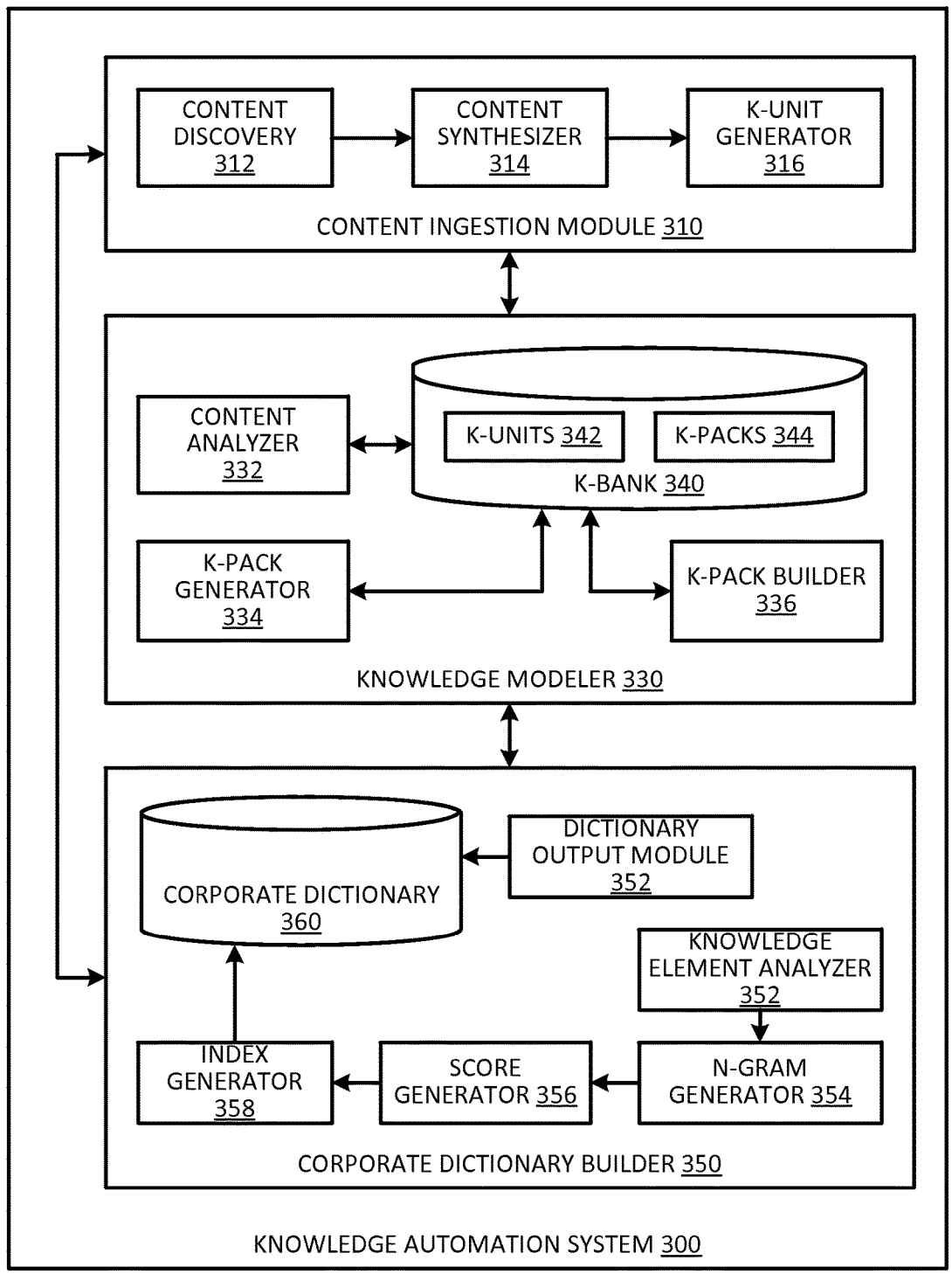
FIG. 3 illustrates a block diagram of a knowledge automation system, according to some embodiments.

FIG. 3 illustrates a more detailed block diagram of a knowledge automation system 300, according to some embodiments. Knowledge automation system 300 can be implemented as a data processing system, and may include a content ingestion module 310, a knowledge modeler 330, and a corporate dictionary builder 350. In some embodiments, the processes performed by knowledge automation system 300 can be performed in real-time. For example, as the data content or knowledge corpus available to the knowledge automation system changes, knowledge automation system 300 may react in real-time and adapt its services to reflect the modified knowledge corpus.

Content ingestion module 310 may include a content discovery module 312, a content synthesizer 314, and a knowledge unit generator 316. Content discovery module 312 interfaces with one or more content sources to discover contents stored at the content sources, and to retrieve the content for analysis. In some embodiments, knowledge automation system 300 can be deployed to an enterprise that already has a pre-existing content library. In such scenarios, content discovery module 312 can crawl or mine the content library for existing data files, and retrieve the data files for ingestion. In some embodiments, the content sources can be continuously monitored to detect the addition, removal, and/or updating of content. When new content is added to a content source or a pre-existing content is updated or modified, content discovery module 312 may retrieve the new or updated content for analysis. New content may result in new knowledge units being generated, and updated content may result in modifications being made to affected knowledge units and/or new knowledge units being generated. When content is removed from a content source, content discovery module 312 may identify the knowledge units that were derived from the removed content, and either remove the affected knowledge units from the knowledge bank, or tag the affected knowledge units as being potentially invalid or outdated.

Content synthesizer 314 receives content retrieved by content discovery module 312, and synthesizes the content to extract information contained in the content. The content retrieved by content discovery module 312 may include different types of content having different formats, storage requirements, etc. As such, content synthesizer 314 may convert the content into a common format for analysis. Content synthesizer 314 may identify key terms (e.g., keywords and/or key phrases) in the content, determine a frequency of occurrence of the key terms in the content, and determining locations of the key terms in the content (e.g., an offset of the key terms from a starting point such as the first or last term of the content). In addition to analyzing information contained in the content, content synthesizer 314 may also extract metadata associated with the content (e.g., author, creation date, title, revision history, etc.).

Knowledge unit generator 316 may then generate knowledge units from the content based on patterns of key terms used in the content and the metadata associated with the content. For example, if a document has a large frequency of occurrence of a key term in the first three paragraphs of the document, but a much lower frequency of occurrence of that same key term in the remaining portions of the document, the first three paragraphs of the document can be extracted and formed into a knowledge unit. As another example, if there is a large frequency of occurrence of a key term distributed throughout a document, the entire document can be formed into a knowledge unit. The generated knowledge units are stored in a knowledge bank 340, and indexed based on the identified key terms and metadata to make the knowledge units searchable in knowledge bank 340.

Knowledge modeler 330 may include content analyzer 332, knowledge bank 340, knowledge pack generator 334, and knowledge pack builder 336. Content analyzer 332 may perform various types of analyses on the knowledge units to model the knowledge contained in the knowledge units. For example, content analyzer 332 may perform key term extraction and entity (e.g., names, companies, organizations, etc.) extraction on the knowledge units, and build a taxonomy of key terms and entities representing how the key terms and entities are used in the knowledge units. Content analyzer 332 may also perform contextual, sematic, and linguistic analyses on the knowledge units to infer concepts and topics covered by the knowledge units. For example, natural language processing can be performed on the knowledge units to derive concepts and topics covered by the knowledge units. Based on the various analyses, content analyzer 332 may derive a term vector for each knowledge unit to represent the knowledge contained in each knowledge unit. The term vector for a knowledge unit may include key terms, entities, and dates associated with the knowledge unit, topic and concepts associated with the knowledge unit, and/or other metadata such as authors associated with the knowledge unit. Using the term vectors, content analyzer 332 may perform similarity mapping between the knowledge units to identify knowledge units that cover similar topics or concepts.

Knowledge pack generator 334 may analyze the similarity mapping performed by content analyzer 332, and automatically form knowledge packs by combining similar knowledge units. For example, knowledge units that share at least five common key terms can be combined to form a knowledge pack. As another example, knowledge units covering the same topic can be combined to form a knowledge pack. In some embodiments, a knowledge pack may include other knowledge packs, or a combination of knowledge pack(s) and knowledge unit(s). For example, knowledge packs that are viewed and consumed by the a set of users can be combined into a knowledge pack. The generated knowledge packs can be tagged with their own term vectors to represent the knowledge contain in the knowledge pack, and be stored in knowledge bank 340.

Knowledge pack builder 336 may provide a user interface to allow knowledge publishers to create custom knowledge packs. Knowledge pack builder 336 may present a list of available knowledge units to a knowledge publisher to allow the knowledge publisher to select specific knowledge units to include in a knowledge pack. In this manner, a knowledge publisher can create a knowledge pack targeted to specific knowledge consumers. For example, a technical trainer can create a custom knowledge pack containing knowledge units covering specific new features of a produce to train a technical support staff. The custom knowledge packs can also be tagged and stored in knowledge bank 340.

Knowledge bank 340 is used for storing knowledge units 342 and knowledge packs 344. Knowledge bank 340 can be implemented as one or more data stores. Although knowledge bank 340 is shown as being local to knowledge automation system 300, in some embodiments, knowledge bank 340, or part of knowledge bank 340 can be remote to knowledge automation system 300. In some embodiments, frequently requested, or otherwise highly active or valuable knowledge units and/or knowledge packs, can be maintained in a low latency, multiple redundancy data store. This makes the knowledge units and/or knowledge packs quickly available when requested by a user. Infrequently accessed knowledge units and/or knowledge packs may be stored separately in slower storage.

Each knowledge unit and knowledge pack can be assigned an identifier that is used to identify and access the knowledge unit or knowledge pack. In some embodiments, to reduce memory usage, instead of storing the actual content of each knowledge unit in knowledge bank 340, the knowledge unit identifier referencing the knowledge unit and the location of the content source of the content associated with the knowledge unit can be stored. In this manner, when a knowledge unit is accessed, the content associated with the knowledge unit can be retrieved from the corresponding content source. For a knowledge pack, a knowledge pack identifier referencing the knowledge pack, and the identifiers and locations of the knowledge units and/or knowledge packs that make up the knowledge pack can be stored. Thus, a particular knowledge pack can be thought of as a container or a wrapper object for the knowledge units and/or knowledge packs that make up the particular knowledge pack. In some embodiments, knowledge bank 340 may also store the actual content of the knowledge units, for example, in a common data format. In some embodiments, knowledge bank 340 may selectively store some content while not storing other content (e.g., content of new or frequently accessed knowledge units can be stored, whereas stale or less frequently accessed content are not stored in knowledge bank 340).

Knowledge units 342 can be indexed in knowledge bank 340 according to key terms contained in the knowledge unit (e.g., may include key words, key phrases, entities, dates, etc. and number of occurrences of such in the knowledge unit) and/or associated metadata (e.g., author, location such as URL or identifier of the content, date, language, subject, title, file or document type, etc.). In some embodiments, the metadata associated with a knowledge unit may also include metadata derived by knowledge automation system 300. For example, this may include information such as access control information (e.g., which user or user group can view the knowledge unit), topics and concepts covered by the knowledge unit, knowledge consumers who have viewed and consumed the knowledge unit, knowledge packs that the knowledge unit is part of, time and frequency of access, etc.). Knowledge packs 344 stored in knowledge bank may include knowledge packs automatically generated by the system, and/or custom knowledge packs created by users (e.g., knowledge publishers). Knowledge packs 344 may also be indexed in a similar manner as for knowledge units described above. In some embodiments, the metadata for a knowledge pack may include additional information that a knowledge unit may not have. For example, the metadata for a knowledge pack may additionally include a category type (e.g., newsletter, emailer, training material, etc.), editors, target audience, etc.

In some embodiments, a term vector can be associated with each knowledge element (e.g., a knowledge unit and/or a knowledge pack). The term vector may include key terms, metadata, and derived metadata associated with the each knowledge element. In some embodiments, instead of including all key terms present in a knowledge element, the term vector may include a predetermined number of key terms with the highest occurrence count in the knowledge element (e.g., the top five key terms in the knowledge element, etc.), or key terms that have greater than a minimum number of occurrences (e.g., key terms that appear more than ten times in a knowledge element, etc.).

Corporate dictionary builder 350 may include a knowledge element analyzer 352, an n-gram generator 354, a score generator 356, index generator 358, and a corporate dictionary 360 that stores a set of n-grams determined for use as the corporate dictionary. Knowledge element analyzer 352 retrieves knowledge elements from knowledge bank 340, and synthesizes the knowledge elements to extract information contained in the knowledge elements. For example, knowledge element analyzer 352 may identify terms (e.g., unigrams having a unit of a single word) in the knowledge elements, determine a frequency of occurrence of each term in the knowledge elements, and determine locations of each term in the knowledge elements (e.g., an offset of the terms from a starting point such as the first or last term of the content). Based on the various analyses, knowledge element analyzer 352 may derive a comprehensive term vector for each knowledge element that includes all the terms associated with each knowledge element and the frequency and location information associated with each term.

The use of all the terms associated with each knowledge element to derive a comprehensive term vector may capture undesirable noise such as different forms of a term, pronouns, articles, nonsensical terms, etc. Thus, knowledge element analyzer 352 may also perform natural language processing including contextual, semantic, and linguistic analyses on the knowledge elements to provide context as to how a term is being used in each knowledge element such that the noise can be filtered out of the comprehensive term vector. For example, natural language processing can be used to identify pronouns and the terms or phrases being substituted by pronouns. Natural language processing can also filter out nonsensical terms and articles such as "a" and "the" that knowledge element analyzer 352 may ignore. Different forms of a term (e.g., past tense, present tense, etc.) can also be normalized into its base term. Acronyms can also be converted into their expanded form. Based on the natural language processing, knowledge element analyzer 352 may derive a comprehensive term vector for each knowledge element that has been filtered for noise reduction or elimination.

The n-gram generator 354 may analyze the filtered comprehensive term vector for each knowledge element derived by knowledge element analyzer 352, and automatically generate n-grams (e.g., key terms or key phrases) based on frequently occurring key terms within the filtered comprehensive term vectors. For example, the n-gram generator 356 may identify a frequently occurring key term within a filtered comprehensive term vector as a pivot point, and perform natural language processing to determine categories or characterizations (e.g., noun, verb, adverb, adjective, entity such as names, companies or organizations, header, title, time, etc.) of the frequently occurring term used as the pivot point and the terms adjacent to the pivot point within a knowledge element. The n-gram generator 354 may then calculate a probability of the terms adjacent to the pivot point as preceding or following the frequently occurring term based on a function of the term frequency, term location, context of the terms, category of the terms, and/or characterization of the terms previously determined for each term. An n-gram comprising at least one of the frequently occurring term used as the pivot point, the preceding term, and the later term can be derived from the calculated probabilities. In some embodiments, an n-gram may refer to terms or phrases and may be constructed of up to three words, e.g., the n-gram may be a unigram, a bigram, or a trigram. Consequently, terms preceding or following one another can be identified as being part of an n-gram, for example, if terms of n-gram have a high probability of being used with one another. In some embodiments, a minimum threshold probability (e.g., 85% probability) can be set, and terms appearing in the content with a probability of greater than the minimum threshold probability can be identified as being part of an n-gram. The frequently occurring term used as the pivot point may be placed within the n-gram either before or after the preceding term and/or the later term that have a probability greater than the minimum threshold probability.

Score generator 356 may calculate a score for each n-gram based on a function of recency, frequency, and commonality of the terms within the n-gram across the knowledge corpus of the enterprise. For example, score generator 356 may implement a scoring algorithm that increases or decreases a score for each n-gram as a function of recency, frequency, and commonality of the terms within the n-gram across the knowledge elements. Recency of the terms refers to a temporal measurement of how recently the term was used in the knowledge elements, e.g., those terms used more recently may be of greater importance to the enterprise and therefore may be configured to receive a higher score. Frequency of the terms refers to a number of occurrences of each term in the knowledge elements. Commonality of the terms refers to whether each term is shared or common amongst the knowledge elements.

Index generator 358 may analyze the score for each n-gram (e.g., term or phrase) calculated by score generator 356, and automatically generate a term and phrase index or corporate dictionary based on the analysis. For example, the index generator 358 can create a list of all n-grams to be potentially added to the term and phrase index or corporate dictionary and sort the list based on the score for each n-gram. In some embodiments, a top predetermined percentage (e.g., 25%) of the n-grams in the sorted listed may be added to the term and phrase index or corporate dictionary. In alternative embodiments, the index generator 358 can set a minimum threshold score (e.g., 75 out of 100), and each n-gram having a score greater than the minimum threshold score can be added to the term and phrase index or corporate dictionary.

Corporate dictionary 360 is used for storing the term and phrase index or corporate dictionary generated by the index generator 358. Corporate dictionary 360 can be implemented as one or more data stores. Although corporate dictionary 360 is shown as being local to knowledge automation system 300, in some embodiments, corporate dictionary 360, or part of corporate dictionary 360 can be remote to knowledge automation system 300. In some embodiments, dictionary output module 365 can generate a graphical user interface through which the user can interact with the corporate dictionary 360. The user can sort and filter the dictionary based on various criteria, such as based on the number of terms to include, frequency thresholds, suggested clusters or subsets of content to view, etc. The corporate dictionary 360 can include links to knowledge elements that include terms or phrases identified in the dictionary. When a term is selected, the corporate dictionary 360 can send a request to the knowledge bank 340 to retrieve the corresponding knowledge element. In some embodiments, a portion of a knowledge element including the selected term can be retrieved and displayed to the user in an overlay interface. In some embodiments, each term or phrase in the corporate dictionary 360 can link to various locations within the enterprise content (e.g., content sources 195-1 . . . 195-n discussed with respect to FIG. 1) that includes that term or phrase. When selected, a link can open the corresponding enterprise content to a location in the content where the term appears. In some embodiments, an overlay or other user interface can be displayed which shows an excerpt of the portion of the content where the term appears. The overlay can include a link that opens the full content. As such, the corporate dictionary 360 serves as a centralized hub for key-words and key-phrases used by an enterprise.

II. Content Discovery, Ingestion, and Analyses

Data content can come in many different forms. For example, data content (may be referred to as "data files") can be in the form of text files, spreadsheet files, presentation files, image files, media files (e.g., audio files, video files, etc.), data record files, communication files (e.g., emails, voicemails, etc.), design files (e.g., computer aided design files, electronic design automation files, etc.), webpages, information or data management files, source code files, and the like. With the vast amount of data content that may be available to a user, finding the right data files with content that matters for the user can be challenging. A user may search an enterprise repository for data files pertaining to a particular topic. However, the search may return a large number of data files, where meaningful content for the user may be distributed across different data files, and some of the data files included in the search result may be of little relevance. For example, a data file that mentions a topic once may be included in the search result, but the content in the data file may have little to do with the searched topic. As a result, a user may have to review a large number of data files to find useful content to fulfill the user's needs.

A knowledge modeling system according to some embodiments can be used to discover and assemble data content from different content sources, and organize the data content into packages for user consumption. Data content can be discovered from different repositories, and data content in different formats can be converted into a normalized common format for consumption. In some embodiments, data content discovered by the knowledge automation system can be separated into individual renderable portions. Each portion of data content can be referred to as a knowledge unit, and stored in a knowledge bank. In some embodiments, each knowledge unit can be associated with information about the knowledge unit, such as key terms representing the content in the knowledge unit, and metadata such as content properties, authors, timestamps, etc. Knowledge units that are related to each other (e.g., covering similar topics) can be combined together to form knowledge packs. By providing such knowledge packs to a user for consumption, the time and effort that a user spends on finding and reviewing data content can be reduced. Furthermore, the knowledge packs can be stored in the knowledge bank, and be provided to other users who may be interested in similar topics. Thus, the content discovery and ingestion for a fixed set of data content can be performed once, and may only need to be repeated if new data content is added, or if the existing data content is modified.

Figure 4:
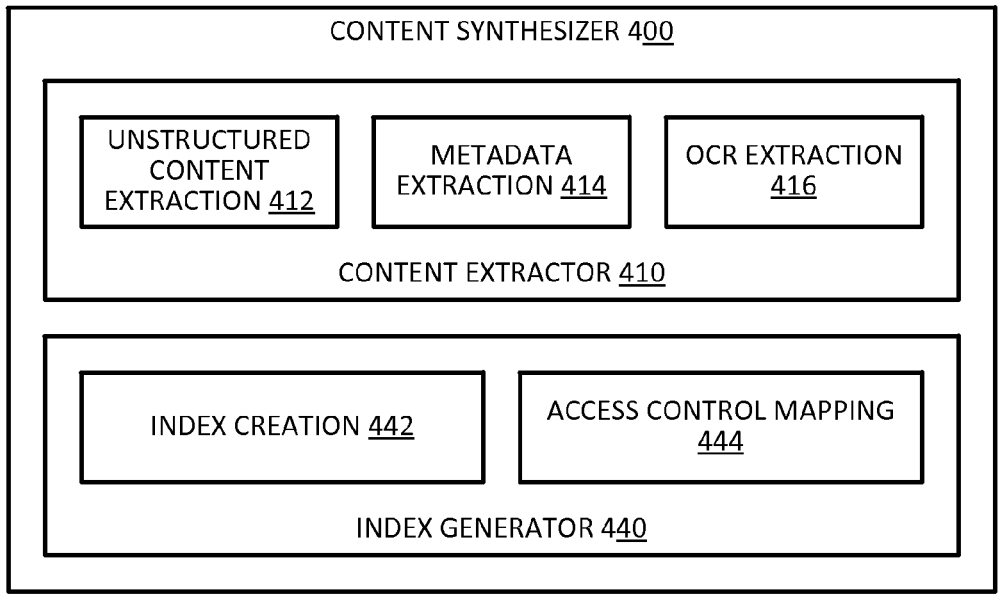
FIG. 4 illustrates a block diagram of a content synthesizer, according to some embodiments.

FIG. 4 illustrates a block diagram of a content synthesizer 400 that can be implemented in a knowledge automation system, according to some embodiments. Content synthesizer 400 can process content in discovered data files, and form knowledge units based on the information contained in the data files. A knowledge unit can be generated from the entire data file, from a portion of the data file, and/or a combination of different sequential and/or non-sequential portions of the data file. A data file may also result in multiple knowledge units being generated from that data file. For example, a knowledge unit can be generated from the entire data file, and multiple knowledge units can be generated from different portions or a combination of different portions of that same data file.

The data files provided to content synthesizer 400 can be discovered by crawling or mining one or more content repositories accessible to the knowledge automation system. Content synthesizer 400 may include a content extractor 410 and an index generator 440. Content extractor 810 can extract information from the data files, and organize the information into knowledge units. Index generator 440 is used to index the knowledge units according to extracted information.

Content extractor 410 may process data files in various different forms, and convert the data files into a common normalized format. For example, content extractor 410 may normalize all data files and convert them into a portable document format. If the data files include text in different languages, the languages can be translated into a common language (e.g., English). Data files such as text documents, spreadsheet documents, presentations, images, data records, etc. can be converted from their native format into the portable document format. For media files such as audio files, the audio can be transcribed and the transcription text can be converted into the portable document format. Video files can be converted into a series of images, and the images can be converted into the portable document format. If the data file include images, optical character recognition (OCR) extraction 416 can be performed on the images to extract text appearing in the images. In some embodiments, object recognition can also be performed on the images to identify objects depicted in the images.

In some embodiments, a data file may be in the form of an unstructured document that may include content that lacks organization or structure in the document (e.g., a text blob). In such cases, content extractor 410 may perform unstructured content extraction 412 to derive relationships of the information contained in the unstructured document. For example, content extractor 410 may identifying key terms used in the document (e.g., key words or key phrases that have multiple occurrences in the document), and the locations of the key terms in the document, and extract portions of the document that have a high concentration of certain key term. For example, if a key term is repeatedly used in the first thirty lines of the document, but does not appear or has a low frequency of occurrence in the remainder of the document, the first thirty lines of the document may be extracted from the document and formed into a separate knowledge unit.

For structured documents, a similar key term analysis can be performed. Furthermore, the organization and structure of the document can be taken into account. For example, different sections or paragraphs of the document having concentrations of different key terms can be extracted from the document and formed into separate knowledge segments, and knowledge units can be formed from the knowledge segments. Thus, for a structured document, how the document is segmented to form the knowledge units can be based in part on how the content is already partitioned in the document.

In addition to extracting information contained in the data files, content extractor 410 may also perform metadata extraction 414 to extract metadata associated with the data files. For example, metadata associated with a data file such as author, date, language, subject, title, file or document type, storage location, etc. can be extracted, and be associated with the knowledge units generated from the data file. This allows the metadata of a data file to be preserved and carried over to the knowledge units, for example, in cases where knowledge units are formed from portions of the data file.

Index generator 440 may perform index creation 442 and access control mapping 444 for the discovered data files and/or knowledge units generated therefrom. Index creation 442 may create, for each data file and/or knowledge unit, a count of the words and/or phrases appearing in the data file and/or knowledge unit (e.g., a frequency of occurrence). Index creation 442 may also associate each word and/or phrase with the location of the word and/or phrase in the data file and/or knowledge unit (e.g., an offset value representing the number of words between the beginning of the data file and the word or phrase of interest).

Access control mapping 444 may provide a mapping of which users or user groups may have access to a particular data file (e.g., read permission, write permission, etc.). In some embodiments, this mapping can be performed automatically based on the metadata associated with the data file or content in the data file. For example, if a document includes the word "confidential" in the document, access to the document can be limited to executives. In some embodiments, to provide finer granularity, access control mapping 444 can be performed on each knowledge unit. In some cases, a user may have access to a portion of a document, but not to other portions of the document.

Figure 5:
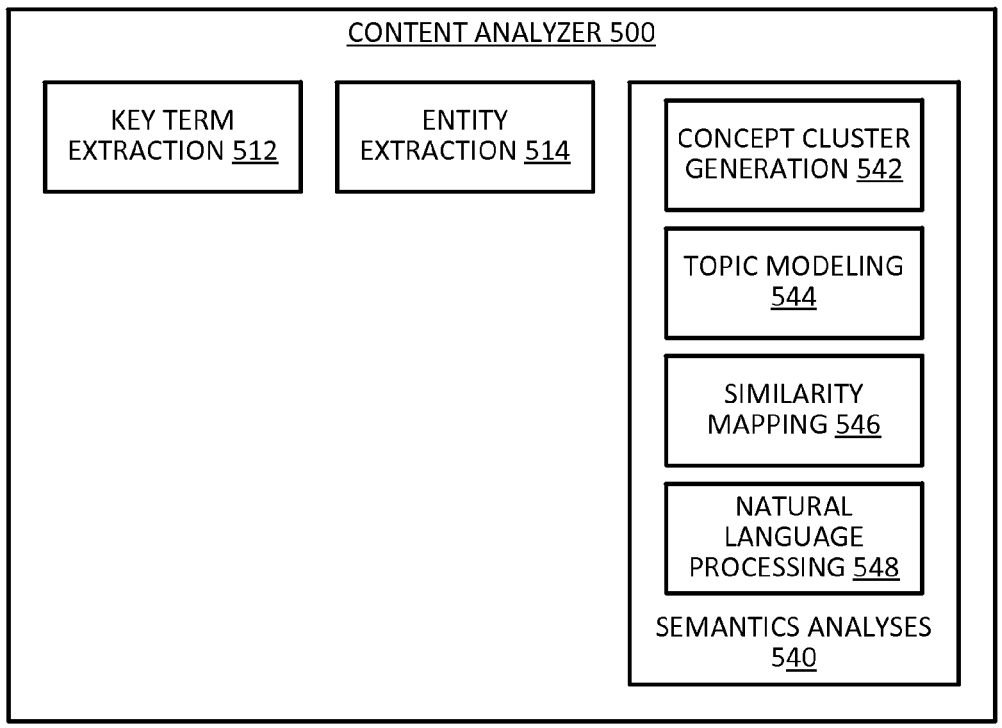
FIG. 5 illustrates a block diagram of a content analyzer, according to some embodiments.

FIG. 5 illustrates a block diagram of a content analyzer 500 that can be implemented in a knowledge automation system, according to some embodiments. Content analyzer 500 may analyze the generated knowledge units, and determine relationships between the knowledge units. Content analyzer 500 may perform key term extraction 512, entity extraction 514, and semantics analyses 540. In some embodiments, content analyzer 500 may derive a term vector representing the content in each knowledge unit based on the analysis, and associate the knowledge unit with the term vector.

Key term extraction 512 can be used to extract key terms (e.g., key words and/or key phrases) that appear in a knowledge unit, and determine the most frequently used key terms (e.g., top ten, twenty, etc.) in a knowledge unit. In some embodiments, key term extraction 512 may take into account semantics analyses performed on the knowledge unit. For example, pronouns appearing in a knowledge unit can be mapped back to the term substituted by the pronoun, and be counted as an occurrence of that term. In addition to extracting key terms, content analyzer 500 may also perform entity extraction 514 for entities appearing in or associated with the knowledge unit. Such entities may include people, places, companies and organizations, authors or contributors of the knowledge unit, etc. In some embodiments, dates appearing in or associated with the knowledge unit can also be extracted. From this information, content analyzer 500 may derive a term vector for each knowledge unit to represent the content in each knowledge unit. For example, the term vector may include most frequently used key terms in the knowledge unit, entities and/or dates associated with the knowledge unit, and/or metadata associated with the knowledge unit.

Semantics analyses 540 performed on the knowledge units by content analyzer 500 may include concept cluster generation 542, topic modeling 544, similarity mapping 546, and natural language processing 548. Concept cluster generation 542 may identify concepts or topics covered by the knowledge units that are similar to each other, and cluster or group together the related concepts or topics. In some embodiments, concept cluster generation 542 may form a topic hierarchy of related concepts. For example, topics such as "teen smoking," "tobacco industry," and "lung cancer" can be organized as being under the broader topic of "smoking."

Topic modeling 544 is used to identify key concepts and themes covered by each knowledge unit, and to derive concept labels for the knowledge units. In some embodiments, key terms that have a high frequency of occurrence (e.g., key terms appearing more than a predetermined threshold number such as key terms appearing more than a hundred times) can be used as the concept labels. In some embodiments, topic modeling 544 may derive concept labels contextually and semantically. For example, suppose the terms "airline" and "terminal" are used in a knowledge unit, but the terms do not appear next to each other in the knowledge unit. Topic modeling 544 may nevertheless determine that the "airline terminal" is a topic covered by the knowledge unit, and use this phrase as a concept label. A knowledge unit can be tagged with the concept or concepts that the knowledge unit covers, for example, by including one or more concept labels in the term vector for the knowledge unit.

Similarity mapping 546 can determine how similar a knowledge unit is to other knowledge units. In some embodiments, a knowledge unit distance metric can be used to make this determination. For example, the term vector associated with a knowledge unit can be modeled as a n-dimensional vector. Each key term or group of key terms can be modeled as a dimension. The frequency of occurrence for a key term or group of key terms can be modeled as another dimension. Concept or concepts covered by the knowledge unit can be modeled as a further dimension. Other metadata such as author or source of the knowledge unit can each be modeled as other dimensions, etc. Thus, each knowledge unit can be modeled as vector in n-dimensional space. The similarity between two knowledge units can then be determined by computing a Euclidean distance in n-dimensional space between the end points of the two vectors representing the two knowledge units. In some embodiments, certain dimensions may be weighted differently than other dimensions. For example, the dimension representing key terms in a knowledge unit can be weighted more heavily than the dimensions representing metadata in the Euclidean distance computation (e.g., by including a multiplication factor for the key term dimension in the Euclidean distance computation). In some embodiments, certain attributes of the knowledge unit (e.g., author, etc.) can also be masked such that the underlying attribute is not included in the Euclidean distance computation.

Natural language processing 548 may include linguistic and part-of-speech processing (e.g., verb versus noun, etc.) of the content and words used in the knowledge unit, and tagging of the words as such. Natural language processing 548 may provide context as to how a term is being used in the knowledge unit. For example, natural language processing 548 can be used to identify pronouns and the words or phrases being substituted by pronouns. Natural language processing 548 can also filter out article words such as "a" and "the" that content analyzer 500 may ignore. Different forms of a term (e.g., past tense, present tense, etc.) can also be normalized into its base term. Acronyms can also be converted into their expanded form.

Figure 6:
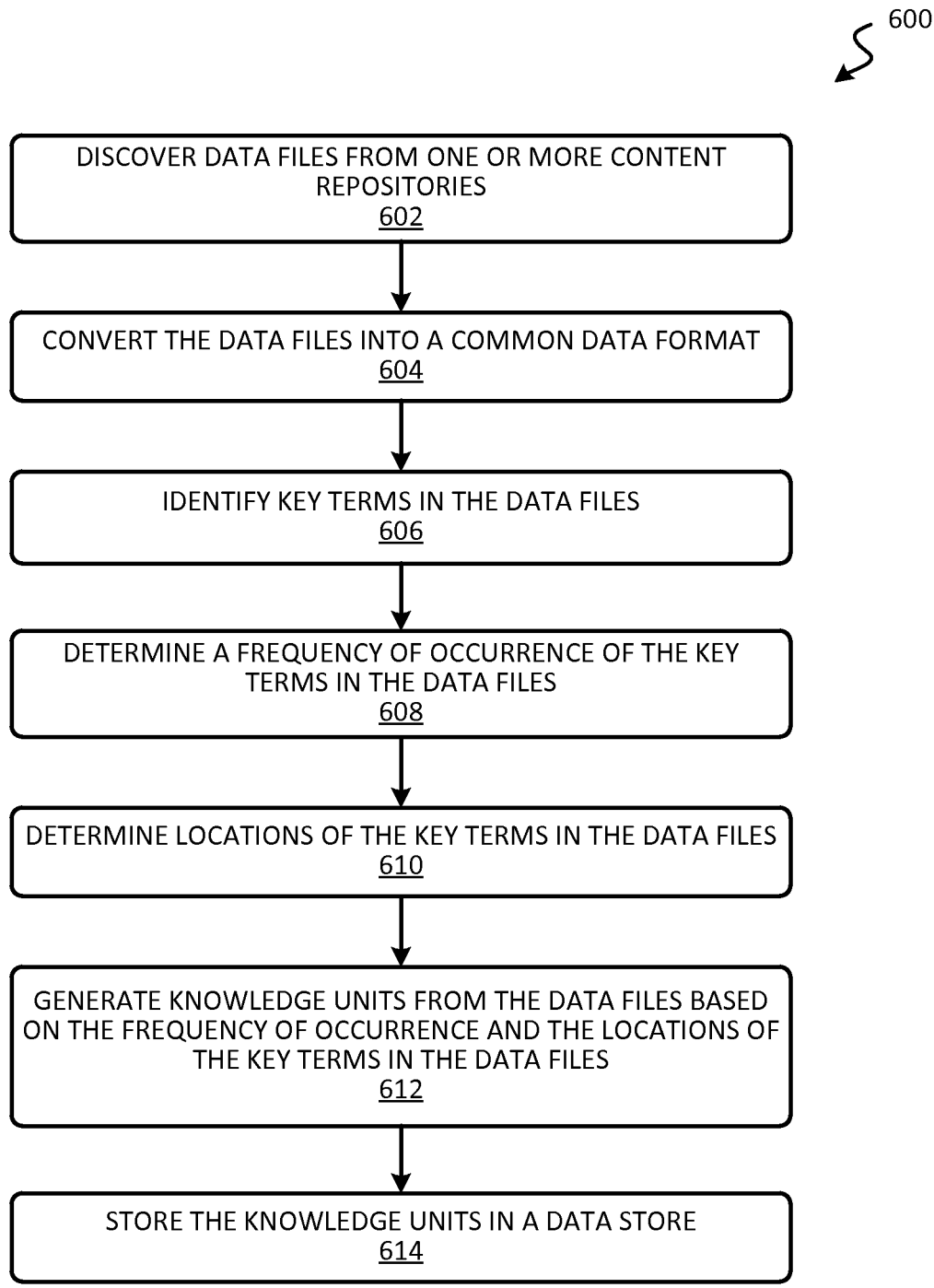
FIG. 6 illustrates a flow diagram of a content discovery and ingestion process, according to some embodiments.

FIG. 6 illustrates a flow diagram of a content discovery and ingestion process 600 that can be performed by a knowledge automation system, according to some embodiments. The processing depicted in FIG. 6 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). Process 600 may begin at block 602 by discovering data files from one or more content repositories. The data files can be discovered, for example, by crawling or mining one or more content repositories accessible by the knowledge automation system. In some embodiments, the data files can also be discovered by monitoring the one or more content repositories to detect addition of new content or modifications being made to content stored in the one or more content repositories.

At block 604, the discovered data files can be converted into a common data format. For example, documents and images can be converted into a portable document format, and optical character recognition can be performed on the data files to identify text contained in the data files. Audio files can be transcribed, and the transaction text can be converted into the portable document format. Video files can also be converted into a series of images, and the series of images can be converted into the portable document format.

At block 606, key terms can be identified in the discovered data files. A key term may be a key word or a key phrase. In some embodiments, a key term may refer to an entity such as a person, a company, an organization, etc. A word or a phrase can be identified as being a key term, for example, if that term is repeatedly used in the content of the data file. In some embodiments, a minimum threshold number of occurrences (e.g., five occurrences) can be set, and terms appearing in the data file more than the minimum threshold number of occurrences can be identified as a key term. In some embodiments, metadata associated with the data file can also be identified as a key term. For example, a word or a phrase in the title or the filename of the data file can be identified as a key term.

At block 608, for each of the identified key terms, the frequency of occurrence of the key term in the corresponding data file is determined. The frequency of occurrence of the key term can be a count of the number of times the key term appears in the data file. In some embodiments, depending on where the key term appears in the data file, the occurrence of the key term can be given additional weight. For example, a key term appearing in the title of a data file can be counted as two occurrences. In some embodiments, pronouns or other words that are used as a substitute for a key term can be identified and correlated back to the key term to be included in the count.

At block 610, for each of the identified key terms, the location of each occurrence of the key term is determined. In some embodiments, the location can be represented as an offset from the beginning of the document to where the key term appears. For example, the location can be represented as a word count from the beginning of the document to the occurrence of the key term. In some embodiments, page numbers, line numbers, paragraph numbers, column numbers, grid coordinates, etc., or any combination thereof can also be used.

At block 612, knowledge units can be generated from the data files based on the determined frequencies of occurrence and the determined locations of the key terms in the data files. In some embodiments, knowledge units can be generated for a predetermined number of the most frequently occurring key terms in the data file, or key terms with a frequency of occurrence above a predetermined threshold number in the data file. By way of example, the first and last occurrences of the key term can be determined, and the portion of the data file that includes the first and last occurrences of the key term can be extracted and formed into a knowledge unit. In some embodiments, a statistical analysis of the distribution of the key term in the data file can be used to extract the most relevant portions of the data file relating to the key term. For example, different portions of the data file having a concentration of the key term being above a threshold count can be extracted, and these different sections can be combined into a knowledge unit. The portions being combined into a knowledge unit may include sequential portions and/or non-sequential portions. Thus, a data file can be segmented into separate portions or knowledge segments, and one or more of the knowledge units can be formed by combining the different portions or knowledge segments. For a data file that includes unstructured content, and the data file can be segmented based on the locations of the occurrences of the key terms in the data file. For structured data files, the segmentation can be performed based on the organization of the data file (e.g., segment at the end of paragraphs, end of sections, etc.). It should be noted that in some embodiments, a knowledge unit can also be formed from an entire data file.

At block 614, the generated knowledge units can be stored in a data store (e.g., a knowledge bank). In some embodiments, each knowledge unit can be assigned a knowledge unit identifier that can be used to reference the knowledge unit in the data store. Each of the knowledge units can also be associated with a term vector that includes one or more key terms associated with the corresponding knowledge unit. Additional information that can be included in the term vector may include metadata such as author or source of the knowledge unit, location of where the knowledge unit is stored in the one or more content repositories, derived metadata such as the topic or topics associated with the knowledge unit, etc.

Figure 7:
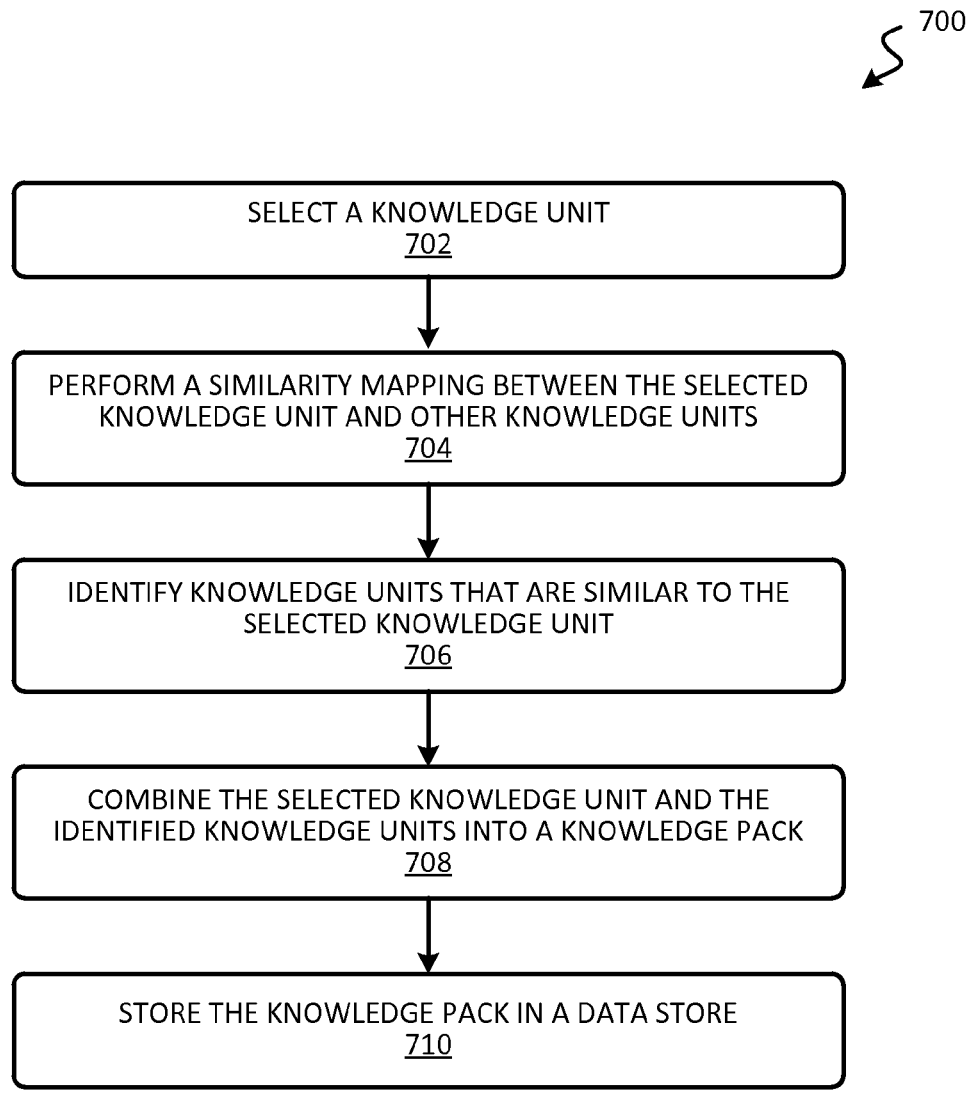
FIG. 7 illustrates a flow diagram of a content analysis process, according to some embodiments.

FIG. 7 illustrates a flow diagram of a content analysis process 700 that can be performed by a knowledge automation system on the generated knowledge units, according to some embodiments. The processing depicted in FIG. 7 may be implemented in software (e.g., code, instructions, program) executed by one or more processing units (e.g., processors, cores), hardware, or combinations thereof. The software may be stored in memory (e.g., on a non-transitory computer-readable storage medium such as a memory device). Process 700 may begin at block 702 by selecting a generated knowledge unit. The knowledge unit can be selected, for example, by an iterative process, randomly, or as a new knowledge unit is generated.

At block 704, a similarity mapping can be performed between the selected knowledge unit and the other knowledge units available in the knowledge bank. Process 700 may use a knowledge unit distance metric, such as a Euclidean distance computation, to determine the amount of similarity between the knowledge units. By way of example, the term vector associated with each knowledge unit can be modeled as a n-dimensional vector, and the Euclidean distance in n-dimensional space between the end points of the vectors representing the knowledge units can be used to represent the amount of similarity between the knowledge units.

At block 706, one or more knowledge units that are similar to the selected knowledge unit can be identified. For example, a knowledge unit can be identified as being similar to the selected knowledge unit if the knowledge unit distance metric (e.g., Euclidean distance) between that knowledge unit and the selected knowledge unit is below a predetermined threshold distance. In some embodiments, this threshold distance can be adjusted to adjust the number of similar knowledge units found.

At block 708, the selected knowledge unit and the identified one or more similar knowledge units can be combined and formed into a knowledge pack. The knowledge pack can then be stored in a data store (e.g., a knowledge bank) at block 710 for consumption by a knowledge consumer. In some embodiments, each knowledge pack can be assigned a knowledge pack identifier that can be used to reference the knowledge unit in the data store. Each of the knowledge packs can also be associated with a term vector that includes one or more key terms associated with the corresponding knowledge pack. In some embodiments, because a knowledge pack may have a large number of key terms, the key terms included in the knowledge pack term vector can be limited to a predetermined number of the most frequently occurring key terms (e.g., top twenty key terms, top fifty key terms, etc.). Additional information that can be included in the term vector may include metadata and derived metadata such as the topic or topics associated with the knowledge pack, a category that the knowledge pack belongs to, etc.

Figure 8:
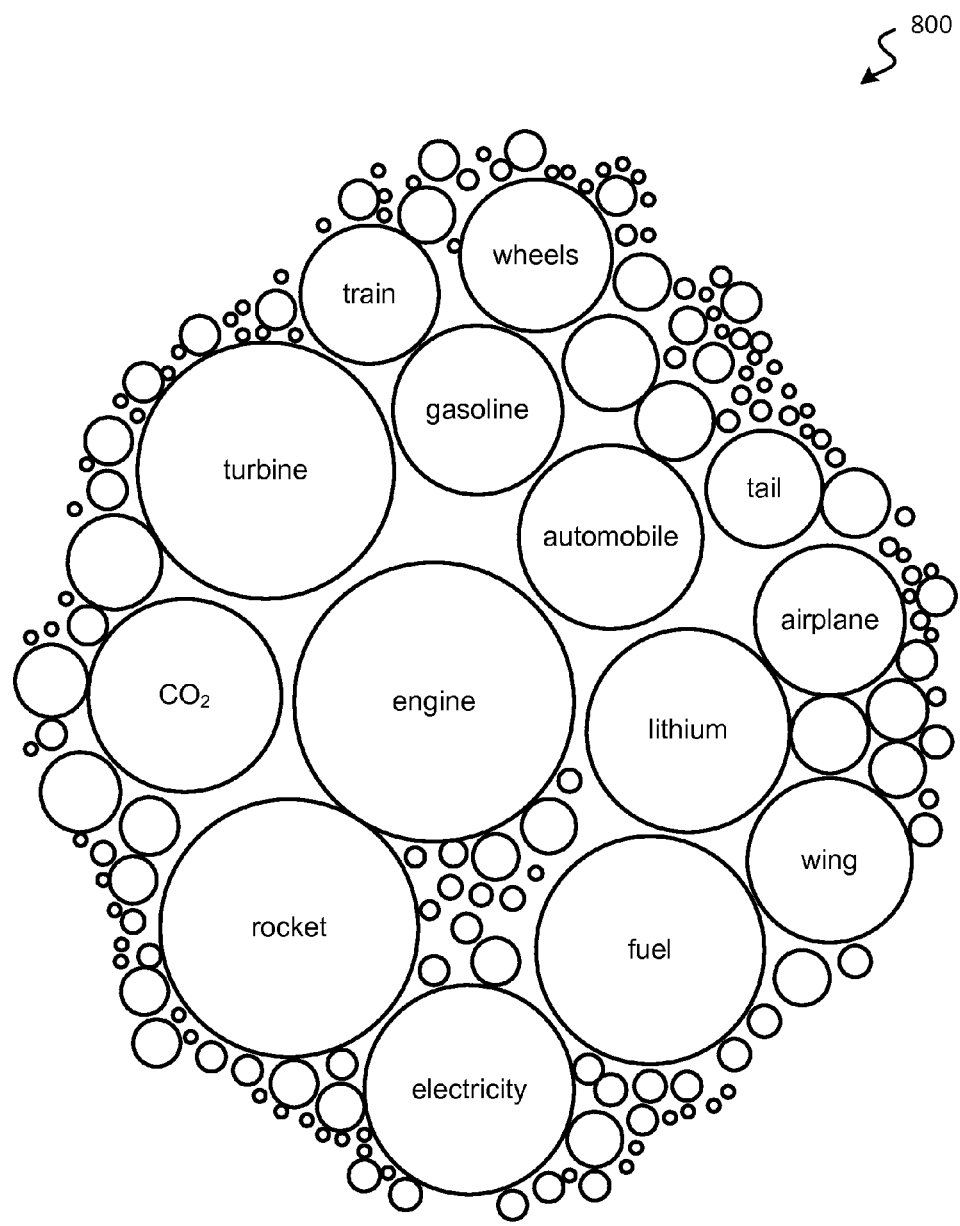
FIG. 8 illustrates an example of a graphical representation of a knowledge corpus of a knowledge automation system, according to some embodiments.

FIG. 8 illustrates an example of a graphical representation of the knowledge corpus of a knowledge automation system, according to some embodiments. The graphical representation shown in FIG. 8 may be referred to as a bubble chart 800. Each circle or bubble in bubble chart 800 can represent a key term or a topic that the knowledge automation system has identified. The size of the circle or bubble represents that amount of content available for each key term or topic. The knowledge automation system can generate bubble chart 800, and display it on a graphical user interface for a user to view. In some embodiments, a user may refer to bubble chart 800 to determine how much knowledge is available for each key term or topic.

Figure 9:
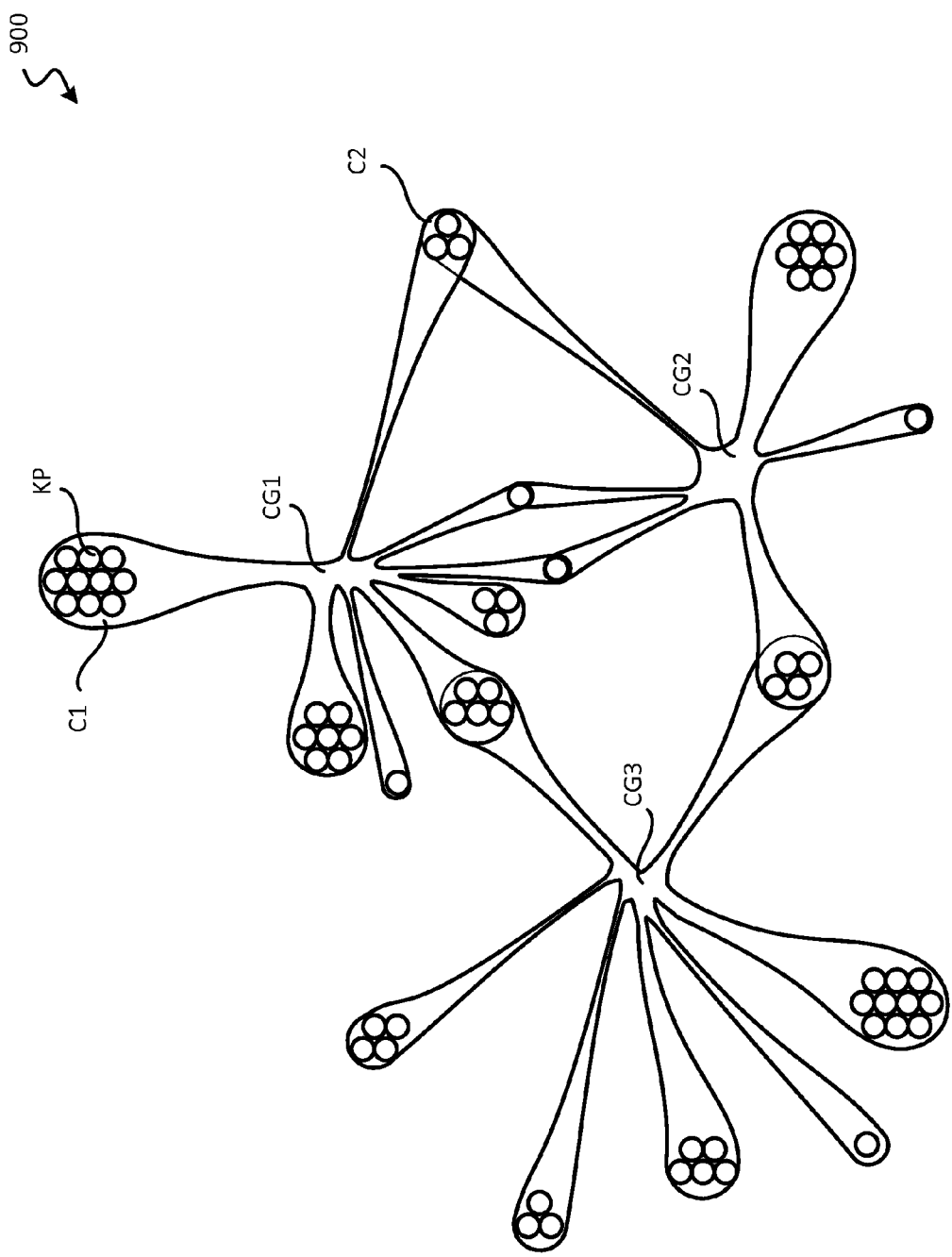
FIG. 9 illustrates an example of a graphical representation of a knowledge map, according to some embodiments.

FIG. 9 illustrates an example of a graphical representation of a knowledge map 900 that can be generated by a knowledge automation system, according to some embodiments. A knowledge map can be displayed to a user to provide a graphical representation of relationships between knowledge available in a knowledge automation system. Each bubble on the knowledge map 900 may represent a knowledge pack (e.g., KP). The knowledge pack bubbles are grouped together to form knowledge pack clusters (e.g., CC1, CC2) based on the conceptual similarities between the knowledge packs. Each knowledge pack cluster can be part of a concept group (e.g., CG1, CG2, CG3), or can be a standalone cluster. A concept group may correlate to a root topic, and each knowledge pack cluster may correlate to a subtopic. Knowledge map 1300 can represent how clusters of knowledge packs are similar or related to one another, and how the clusters may overlap with one another. For example, on the knowledge map 900 shown in FIG. 9, concept group CG1 may correlate to the topic "smoking," and concept group CG2 may correlate to the topic "cancer." Knowledge group cluster C1 is a subtopic of concept group CG1. For example, knowledge group cluster C1 may correlate to the topic "teen smoking," which is a subtopic of "smoking" Knowledge group cluster C2 is a subtopic that overlaps with both concept groups CG1 and CG2. For example, knowledge group cluster C2 may correlate to the topic "lung cancer," which is a subtopic of both "smoking" and "cancer."

III. Corporate Dictionary Generation

In some embodiments, the knowledge automation system can provide a corporate dictionary generation service to automatically generate a term and phrase index comprising key terms and phrases relevant to knowledge added to the system. The corporate dictionary can be shared enterprise-wide and can include commonly used terms and phrases specific to a given enterprise. In this manner, administrators, managers, employees, and other users of an enterprise can view, search, and sort terms and phrases commonly used in the enterprise.

In some embodiments, when new content is added or generated within an enterprise (e.g., when new training materials are generated for a product release, when new content repositories are added, etc.), the new content can automatically be analyzed by the content ingestion module (e.g., content ingestion module 310 as discussed with respect to FIG. 3) and added to the knowledge database (e.g., knowledge bank 340 as discussed with respect to FIG. 3). The new content (e.g., content within knowledge units and knowledge packs) added to the knowledge database can trigger the corporate dictionary builder to dynamically generate a new corporate dictionary or revise an older version of the corporate dictionary with additional words and phrases. Similarly, as content is removed, words and phrases included in that content can be removed. As such, the corporate dictionary is automatically maintained such that it includes an up-to-date index of enterprise content.

In some embodiments, a dictionary output module can generate a graphical user interface through which the user can interact with the corporate dictionary. The user can sort and filter the corporate dictionary based on various criteria, such as based on the number of terms to include, frequency thresholds, suggested clusters or subsets of content to view, etc. The corporate dictionary can include links to knowledge elements that include terms or phrases identified in the corporate dictionary. When a term is selected, the corporate dictionary can send a request to the knowledge database to retrieve the corresponding knowledge element. In some embodiments, a portion of a knowledge element including the selected term can be retrieved and displayed to the user in an overlay interface. In some embodiments, each term or phrase in the corporate dictionary can link to various locations within the enterprise content that includes that term or phrase. When selected, a link can open the corresponding enterprise content to a location in the content where the term appears. In some embodiments, an overlay or other user interface can be displayed which shows an excerpt of the portion of the content where the term appears. The overlay can include a link that opens the full content. As such, the corporate dictionary serves as a centralized hub for keywords and key-phrases used by an enterprise.

Figure 10:
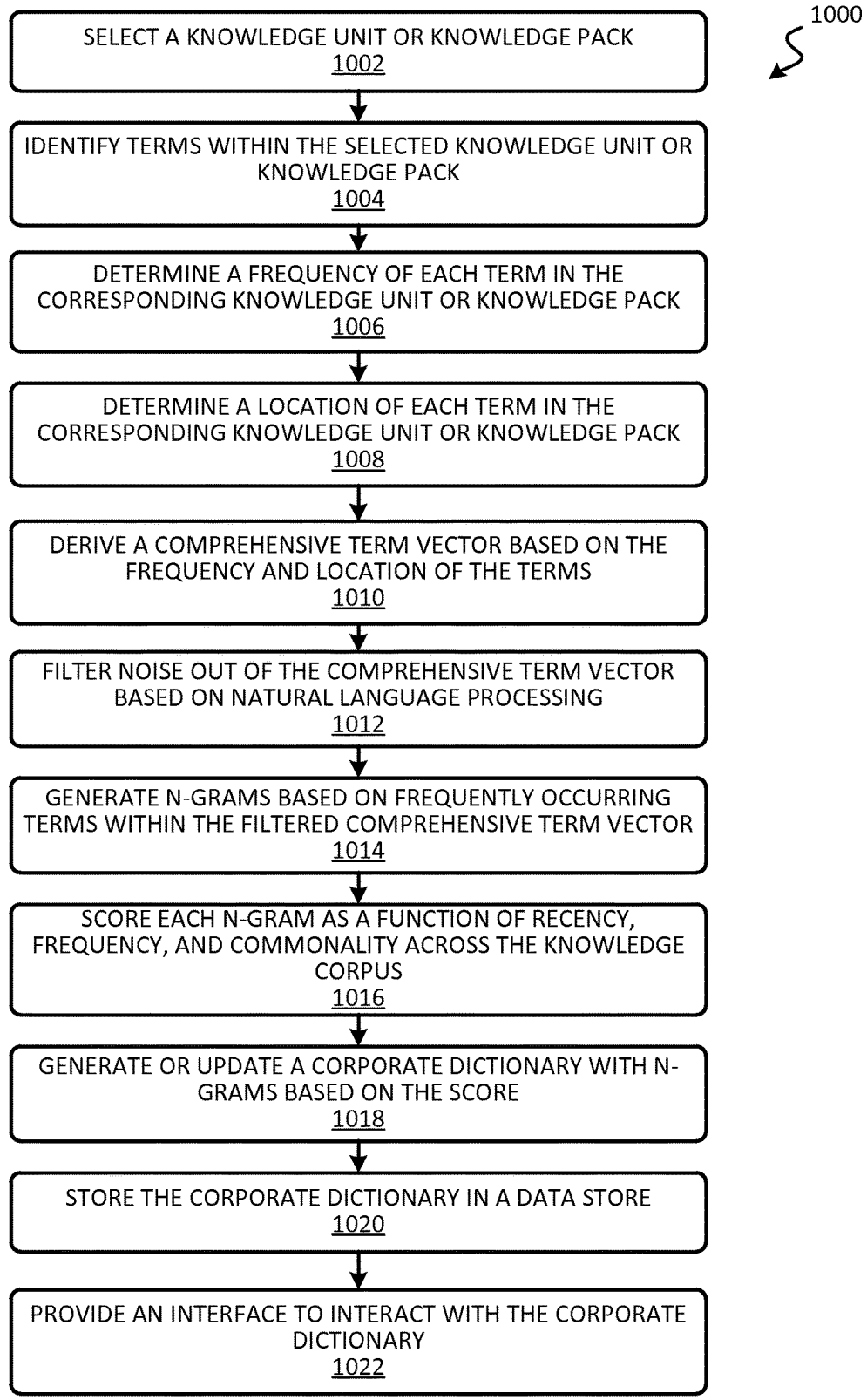
FIG. 10 illustrates a flow diagram of a corporate dictionary generation process, according to some embodiments.

FIG. 10 illustrates a simplified flow diagram 1000 depicting some of the processing that can be performed, for example, by a knowledge automation system on the generated knowledge units and knowledge packs to generate a corporate dictionary, according to some embodiments. The processing depicted in FIG. 10 may be implemented in software (e.g., code, instructions, program) executed by one or more processing units (e.g., processors, cores), hardware, or combinations thereof. The software may be stored in memory (e.g., on a non-transitory computer-readable storage medium such as a memory device).

The processing illustrated in flow diagram 1000 may begin at block 1002 by selecting a generated knowledge unit or knowledge pack from a knowledge corpus of an enterprise. The knowledge unit or knowledge pack can be selected, for example, by an iterative process, randomly, or as a new knowledge unit or knowledge pack is generated, modified, or removed. At block 1004, terms can be identified in the selected knowledge unit or knowledge pack. In some embodiments, a term may be a single word or unigram. At block 1006, for each of the identified terms, the frequency of occurrence of the term in the corresponding knowledge unit or knowledge pack is determined. The frequency of occurrence of the term can be a count of the number of times the term appears in the data file. In some embodiments, depending on where the term appears in the data file, the occurrence of the term can be given additional weight. For example, a term appearing in the title of a knowledge unit or knowledge pack can be counted as two occurrences. In some embodiments, pronouns or other words that are used as a substitute for a term can be identified and correlated back to the term to be included in the count.

At block 1008, for each of the identified terms, the location of each occurrence of the term in the corresponding knowledge unit or knowledge pack is determined. In some embodiments, the location can be represented as an offset from the beginning of the document to where the key term appears. For example, the location can be represented as a word count from the beginning of the document to the occurrence of the key term. In some embodiments, page numbers, line numbers, paragraph numbers, column numbers, grid coordinates, etc., or any combination thereof can also be used.

At block 1010, based on the various analyses performed in blocks 1004, 1006, and 1008, a comprehensive term vector may be derived for the corresponding knowledge unit or knowledge pack. The comprehensive term vector is an algebraic model for representing the knowledge unit or knowledge pack as vectors of terms. Each dimension within the vector may correspond to a separate term. If a term occurs in the document, its value in the vector is non-zero and may be calculated as a function of at least the frequency of the term within the knowledge unit or knowledge pack. In other embodiments, the value in the vector may be calculated as a function of at least the frequency of the term and the position of the term within the knowledge unit or knowledge pack.

At block 1012, natural language processing including contextual, sematic, and linguistic analyses may be performed on the knowledge unit or knowledge pack to provide context as to how each term is being used in the knowledge unit or knowledge pack such that noise can be filtered out of the comprehensive term vector. For example, natural language processing can be performed to identify pronouns and the terms or phrases being substituted by pronouns. Natural language processing can also filter out nonsensical terms and articles such as "a" and "the" that may be ignored within the comprehensive term vector. Different forms of a term (e.g., past tense, present tense, etc.) can also be normalized into its base term. Acronyms can also be converted into their expanded form. Based on the natural language processing, a comprehensive term vector for the knowledge unit or knowledge pack that has been filtered for noise reduction or elimination can be derived.

At block 1014, n-grams (e.g., key terms or key phrases) can be automatically generated based on frequently occurring key terms remaining within the filtered comprehensive term vector. In some embodiments, an n-gram may refer to key terms or key phrases and may be constructed of up to three words, e.g., the n-gram may be a unigram, a bigram, or a trigram. In some embodiments, terms preceding or following one another can be identified as being part of an n-gram, for example, if terms within the vector have a high probability of being used with one another within the knowledge unit or knowledge pack, then the terms may be included in a same n-gram.

At block 1016, a score may be calculated for each n-gram based on a function of recency, frequency, and commonality of the n-gram across the knowledge corpus of the enterprise. For example, a scoring algorithm may be implemented that increases or decreases a score for each n-gram as a function of recency, frequency, and commonality of the terms within the n-gram across the knowledge elements. Recency of the terms refers to a temporal measurement of how recently the term was used in the knowledge elements, e.g., those terms used more recently may be of greater importance to the enterprise and therefore may be configured to receive a higher score. Frequency of the terms refers to a number of occurrences of each term in the knowledge elements. Commonality of the terms refers to whether each term is shared or common amongst the knowledge elements.

At block 1018, the score for each n-gram (e.g., term or phrase) can be analyzed, and a corporate dictionary can be automatically generated or updated based on the analysis. For example, a total number of n-grams extracted for the knowledge unit or knowledge pack may be determined, and a top predetermined percentage (e.g., 25%) of the n-grams extracted for the knowledge unit or knowledge pack may be added to the corporate dictionary. Alternatively, a minimum threshold score can be set, and each n-gram having a score greater than the minimum threshold score can be added to the corporate dictionary.

At block 1020, the corporate dictionary can be stored in one or more data stores (e.g., a database) for consumption by a knowledge consumer. At block 1022, an interface can be provided to interact with the corporate dictionary. In some embodiments, a graphical user interface can be provided through which the user can interact with the corporate dictionary. The user can sort and filter the dictionary based on various criteria, such as based on the number of terms to include, frequency thresholds, suggested clusters or subsets of content to view, etc. The corporate dictionary can include links to knowledge elements that include terms or phrases identified in the dictionary. When a term is selected, the corporate dictionary can send a request to the knowledge bank to retrieve the corresponding knowledge element. In some embodiments, a portion of a knowledge element including the selected term can be retrieved and displayed to the user in an overlay interface. In some embodiments, each term or phrase in the corporate dictionary can link to various locations within the enterprise content (e.g., content sources 195-1 . . . 195-*n* discussed with respect to FIG. 1) that includes that term or phrase. When selected, a link can open the corresponding enterprise content to a location in the content where the term appears. In some embodiments, an overlay or other user interface can be displayed which shows an excerpt of the portion of the content where the term appears. The overlay can include a link that opens the full content.

FIG. 11 illustrates a block diagram of a n-gram generator 1100 that can be implemented in a knowledge automation system, according to some embodiments. N-gram generator 1100 can analyze term vectors for each knowledge element, and automatically generate n-grams (e.g., key terms or key phrases) based on frequently occurring key terms within the term vectors. N-gram generator 1100 may include frequently occurring term identifier 1110 and n-gram extractor 1112. In some embodiments, n-gram generator 1100 may construct key terms and key phrases as n-grams from a term vector associated with a knowledge unit or knowledge pack.

Frequently occurring term identifier 1110 can be used to identify frequently occurring key terms (e.g., top ten, twenty, etc.) within a term vector of a knowledge pack or knowledge unit. For example, as shown in FIG. 12, a term vector 1212 derived from a portion of a first knowledge unit 1210 may include a number of terms that have been filtered to reduce noise including articles, pronouns, prepositions, etc. Frequently occurring term identifier 1110 can utilize the frequency of occurrence of the term and/or the position of the term associated with each term in term vector 1212 to identify the frequently occurring key terms 1214 (e.g., top ten, twenty, etc.).

As shown in FIG. 11, n-gram extractor 1112 can be used to analyze each frequently occurring key term to extract n-grams from the knowledge unit or knowledge pack. For example, the term analyzer 1112 may utilize each key term as a pivot point to identify one or more terms adjacent to each key term in the knowledge unit or knowledge pack, and perform natural language processing to determine categories or characterizations (e.g., noun, verb, adverb, adjective, entity such as names, companies or organizations, header, title, time, etc.) of the one or more terms adjacent to each key term and the key terms. The term analyzer 1112 may then calculate a probability of the one or more terms adjacent to each key term in t the knowledge unit or knowledge pack as preceding or following the key term based on a function of one or more of the term frequency (e.g., frequency of occurrence of the one or more terms adjacent to each key term), term location, and the natural language processing (e.g., context of the terms, category of the terms, and the characterization of the terms). An n-gram comprising the key term used as the pivot point, the preceding term, and the later term can be extracted from the calculated probabilities.

For example, as shown in FIG. 13, each of the frequently occurring key terms may be used as a pivot point within the portion of a first knowledge unit 1310, and natural language processing and probability analysis can be used to determine whether the key term used as the pivot point and one or more adjacent terms (e.g., the preceding term and/or the later term) should be extracted as an n-gram 1312 individually or together. In some embodiments, a minimum threshold probability (e.g., 85% probability) can be set, and when the probability of the one or more terms adjacent to each key term is greater than minimum threshold probability, an n-gram can be extracted comprising the one or more adjacent terms and the key term, e.g., a bigram or trigram. The key term used as the pivot point may be positioned within the n-gram either before or after the preceding term and/or the later term that have a probability greater than the minimum threshold probability. On the other hand, when the probability of the one or more terms adjacent to each key term is less than the minimum threshold probability, an n-gram can be extracted comprising only the key term, e.g., a unigram.

Figure 14:
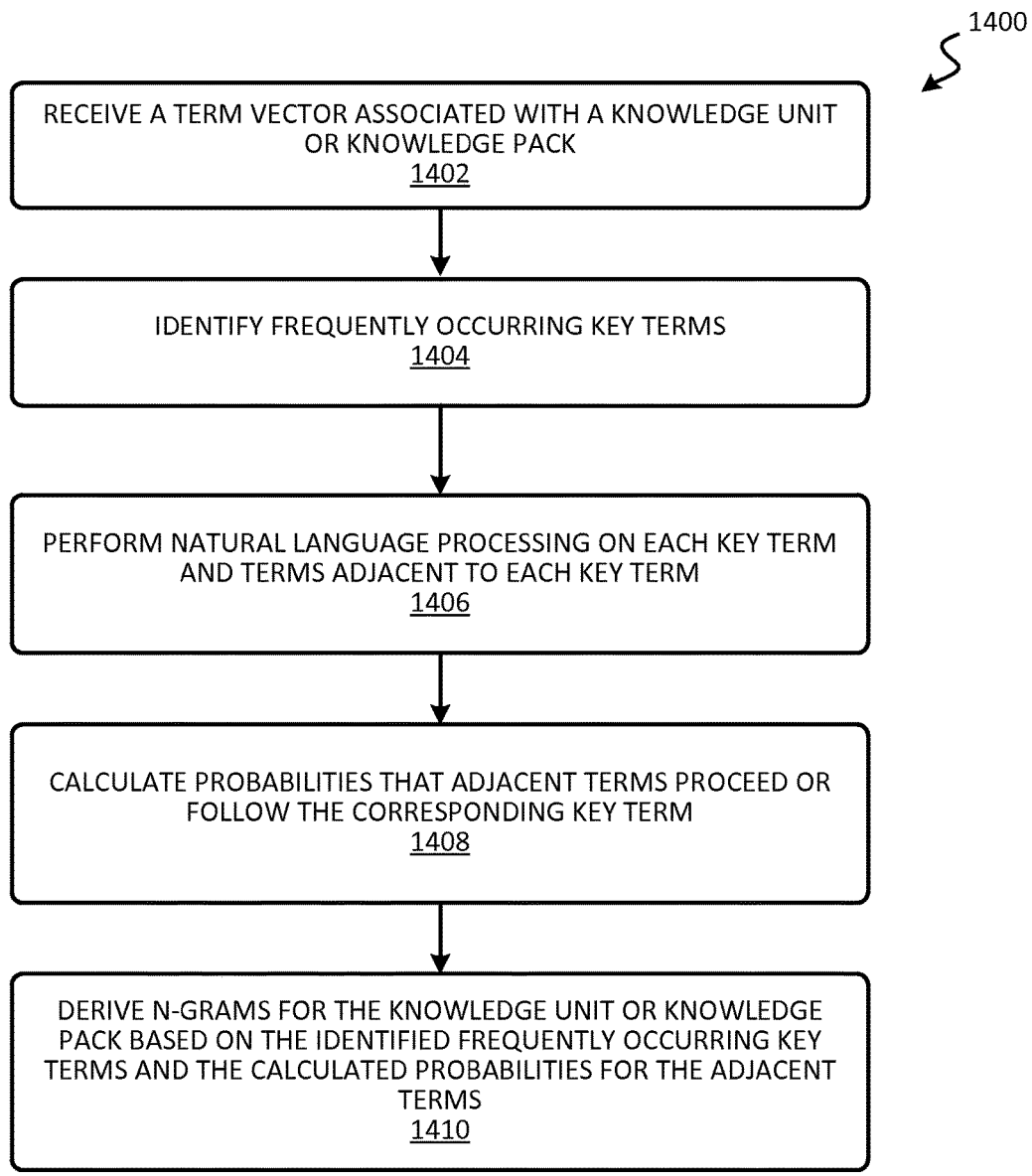
FIG. 14 illustrates a flow diagram for extracting n-grams, according to some embodiments.

FIG. 14 illustrates a simplified flow diagram 1400 depicting some of the processing that can be performed, for example, by a knowledge automation system on the generated knowledge units and knowledge packs to extract n-grams, according to some embodiments. The processing depicted in FIG. 14 may be implemented in software (e.g., code, instructions, program) executed by one or more processing units (e.g., processors, cores), hardware, or combinations thereof. The software may be stored in memory (e.g., on a non-transitory computer-readable storage medium such as a memory device).

The processing illustrated in flow diagram 1400 may begin at block 1402 by receiving a term vector associated with a knowledge unit or knowledge pack. The term vector may include a number of terms that have been filtered to reduce noise including articles, pronouns, prepositions, etc. At block 1404, the frequency of the term and/or the position of the term associated with each term in the term vector can be used to identify the frequently occurring key terms (e.g., top ten, twenty, etc.). At block 1406, each frequently occurring key term can be used as a pivot point, and natural language processing can be performed to determine categories or characterizations (e.g., noun, verb, adverb, adjective, entity such as names, companies or organizations, header, title, time, etc.) of the frequently occurring term used as the pivot point and the terms adjacent to the pivot point within the knowledge unit or knowledge pack.

At block 1408, a probability of the terms adjacent to the pivot point as preceding or following the frequently occurring term can be calculated based on a function of one or more of the term frequency (e.g., frequency of occurrence of the one or more terms adjacent to each key term), term location, and the natural language processing (e.g., context of the terms, category of the terms, and the characterization of the terms). At block 1410, an n-gram comprising one or more of the frequently occurring key term used as the pivot point, the preceding term, and the later term can be derived from the calculated probabilities. For example, a minimum threshold probability (e.g., 85% probability) can be set, and when the probability of the one or more terms adjacent to each key term is greater than minimum threshold probability, an n-gram can be extracted comprising the one or more adjacent terms and the key term, e.g., a bigram or trigram. The key term used as the pivot point may be positioned within the n-gram either before or after the preceding term and/or the later term that have a probability greater than the minimum threshold probability. On the other hand, when the probability of the one or more terms adjacent to each key term is less than the minimum threshold probability, an n-gram can be extracted comprising only the key term, e.g., a unigram.

Figure 15:
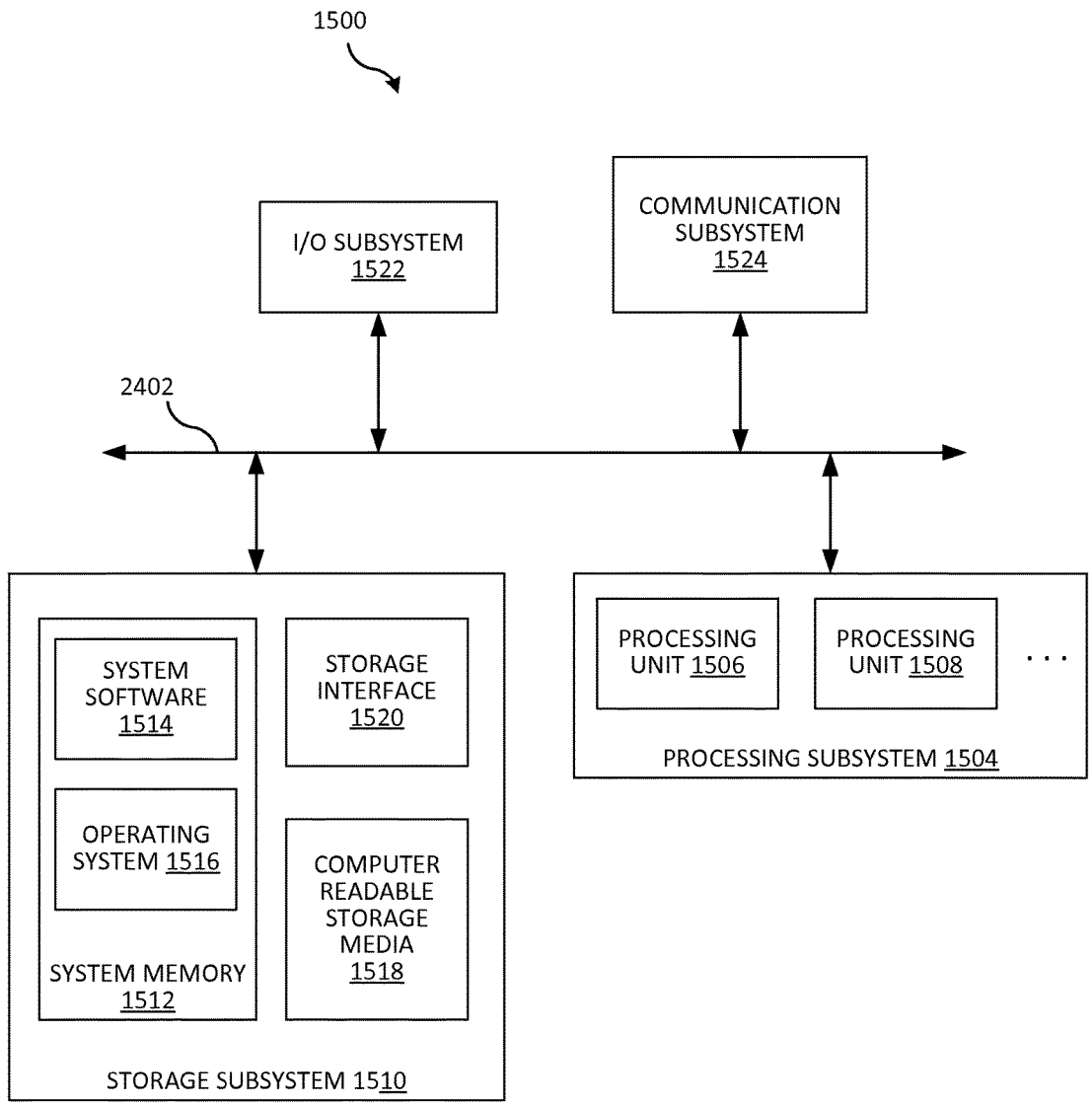
FIG. 15 depicts a block diagram of a computing system, according to some embodiments

FIG. 15 depicts a block diagram of a computing system 1500, in accordance with some embodiments. Computing system 1500 can include a communications bus 1502 that connections one or more subsystems, including a processing subsystem 1504, storage subsystem 1510, I/O subsystem 1522, and communication subsystem 1524.

In some embodiments, processing subsystem 1508 can include one or more processing units 1506, 1508. Processing units 1506, 1508 can include one or more of a general purpose or specialized microprocessor, FPGA, DSP, or other processor. In some embodiments, processing unit 1506, 1508 can be a single core or multicore processor.

In some embodiments, storage subsystem can include system memory 1512 which can include various forms of non-transitory computer readable storage media, including volatile (e.g., RAM, DRAM, cache memory, etc.) and non-volatile (flash memory, ROM, EEPROM, etc.) memory. Memory may be physical or virtual. System memory 1512 can include system software 1514 (e.g., BIOS, firmware, various software applications, etc.) and operating system data 1516. In some embodiments, storage subsystem 1510 can include non-transitory computer readable storage media 1518 (e.g., hard disk drives, floppy disks, optical media, magnetic media, and other media). A storage interface 1520 can allow other subsystems within computing system 1500 and other computing systems to store and/or access data from storage subsystem 1510.

In some embodiments, I/O subsystem 1522 can interface with various input/output devices, including displays (such as monitors, televisions, and other devices operable to display data), keyboards, mice, voice recognition devices, biometric devices, printers, plotters, and other input/output devices. I/O subsystem can include a variety of interfaces for communicating with I/O devices, including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports).

In some embodiments, communication subsystem 1524 can include various communication interfaces including wireless connections (e.g., Wi-Fi, Bluetooth, Zigbee, and other wireless communication technologies) and physical connections (e.g., USB, SCSI, VGA, SVGA, HDMI, DVI, serial, parallel, and other physical ports). The communication interfaces can enable computing system 1500 to communicate with other computing systems and devices over local area networks wide area networks, ad hoc networks, mesh networks, mobile data networks, the internet, and other communication networks.

In certain embodiments, the various processing performed by a knowledge automation system as described above may be provided as a service under the Software as a Service (SaaS) model. According this model, the one or more services may be provided by a service provider system in response to service requests received by the service provider system from one or more user or client devices (service requestor devices). A service provider system can provide services to multiple service requestors who may be communicatively coupled with the service provider system via a communication network, such as the Internet.

In a SaaS model, the IT infrastructure needed for providing the services, including the hardware and software involved for providing the services and the associated updates/upgrades, is all provided and managed by the service provider system. As a result, a service requester does not have to worry about procuring or managing IT resources needed for provisioning of the services. This significantly increases the service requestor's access to these services in an expedient manner at a much lower cost point.

In a SaaS model, services are generally provided based upon a subscription model. In a subscription model, a user can subscribe to one or more services provided by the service provider system. The subscriber can then request and receive services provided by the service provider system under the subscription. Payments by the subscriber to providers of the service provider system are generally done based upon the amount or level of services used by the subscriber.

Figure 16:
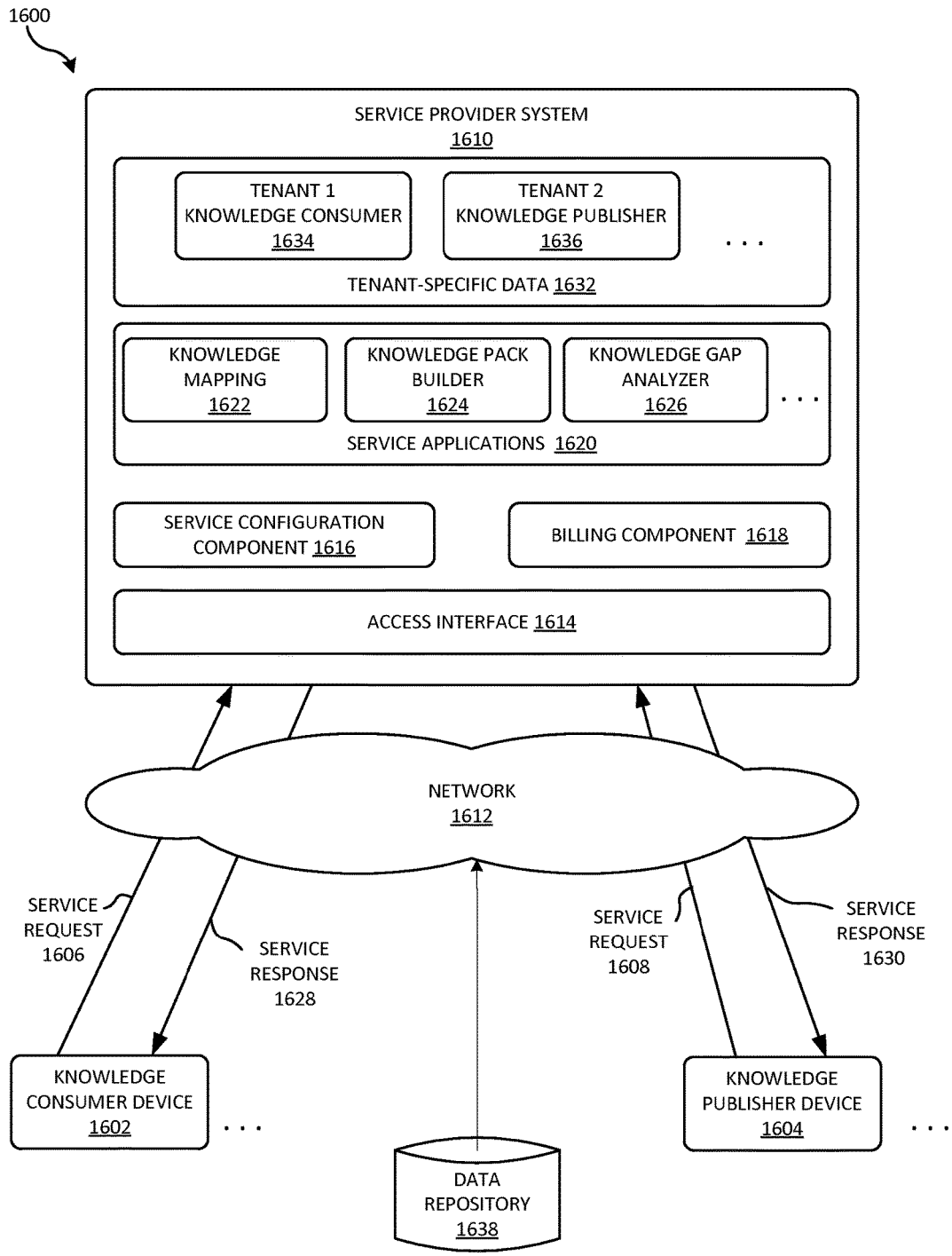
FIG. 16 depicts a block diagram of a service provider system, according to some embodiments.

FIG. 16 depicts a simplified block diagram of a service provider system 1600, in accordance with some embodiments. In the embodiment depicted in FIG. 16, service requestor devices 1604 and 1604 (e.g., knowledge consumer device and/or knowledge publisher device) are communicatively coupled with service provider system 1610 via communication network 1612. In some embodiments, a service requestor device can send a service request to service provider system 1610 and, in response, receive a service provided by service provider system 1610. For example, service requestor device 1602 may send a request 1606 to service provider system 1610 requesting a service from potentially multiple services provided by service provider system 1610. In response, service provider system 1610 may send a response 1628 to service requestor device 1602 providing the requested service. Likewise, service requestor device 1604 may communicate a service request 1608 to service provider system 1610 and receive a response 1630 from service provider system 1610 providing the user of service requestor device 1604 access to the service. In some embodiments, SaaS services can be accessed by service requestor devices 1602, 1604 through a thin client or browser application executing on the service requestor devices. Service requests and responses 1628, 1630 can include HTTP/HTTPS responses that cause the thin client or browser application to render a user interface corresponding to the requested SaaS application. While two service requestor devices are shown in FIG. 16, this is not intended to be restrictive. In other embodiments, more or less than two service requestor devices can request services from service provider system 1610.

Network 1612 can include one or more networks or any mechanism that enables communications between service provider system 1610 and service requestor devices 1602, 1604. Examples of network 1612 include without restriction a local area network, a wide area network, a mobile data network, the Internet, or other network or combinations thereof. Wired or wireless communication links may be used to facilitate communications between the service requestor devices and service provider system 1610.

In the embodiment depicted in FIG. 16, service provider system 1610 includes an access interface 1614, a service configuration component 1616, a billing component 1618, various service applications 1620, and tenant-specific data 1632. In some embodiments, access interface component 1614 enables service requestor devices to request one or more services from service provider system 1610. For example, access interface component 1614 may comprise a set of webpages that a user of a service requestor device can access and use to request one or more services provided by service provider system 1610.

In some embodiments, service manager component 1616 is configured to manage provision of services to one or more service requesters. Service manager component 1616 may be configured to receive service requests received by service provider system 1610 via access interface 1614, manage resources for providing the services, and deliver the services to the requesting requesters. Service manager component 1616 may also be configured to receive requests to establish new service subscriptions with service requestors, terminate service subscriptions with service requestors, and/or update existing service subscriptions. For example, a service requestor device can request to change a subscription to one or more service applications 1622-1626, change the application or applications to which a user is subscribed, etc.).

Service provider system 1610 may use a subscription model for providing services to service requestors according to which a subscriber pays providers of the service provider system based upon the amount or level of services used by the subscriber. In some embodiments, billing component 1618 is responsible for managing the financial aspects related to the subscriptions. For example, billing component 1610, in association with other components of service provider system 1610, may be configured to determine amounts owed by subscribers, send billing statements to subscribers, process payments from subscribers, and the like.

In some embodiments, service applications 1620 can include various applications that provide various SaaS services. For example, one more applications 1620 can provide the various functionalities described above and provided by a knowledge modeling system.

In some embodiments, tenant-specific data 1632 comprises data for various subscribers or customers (tenants) of service provider system 1610. Data for one tenant is typically isolated from data for another tenant. For example, tenant 1's data 1634 is isolated from tenant 2's data 1636. The data for a tenant may include without restriction subscription data for the tenant, data used as input for various services subscribed to by the tenant, data generated by service provider system 1610 for the tenant, customizations made for or by the tenant, configuration information for the tenant, and the like. Customizations made by one tenant can be isolated from the customizations made by another tenant. The tenant data may be stored service provider system 1610 (e.g., 1634, 1636) or may be in one or more data repositories 1638 accessible to service provider system 1610.

It should be understood that the methods and processes described herein are exemplary in nature, and that the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

It should also be understood that the components (e.g., functional blocks, modules, units, or other elements, etc.) of the devices, apparatuses, and systems described herein are exemplary in nature, and that the components in accordance with some embodiments may include one or more additional elements not specially described, omit one or more elements, combine one or more elements into a single element, split up one or more elements into multiple elements, and/or any combination thereof.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter-process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims. For example, one or more features from any embodiment may be combined with one or more features of any other embodiment without departing from the scope of the invention.

What is claimed is:

1. A method comprising:
    obtaining, by a computer system, data files from a knowledge corpus of an enterprise;
    identifying, by the computer system, key terms within the data files;
    determining, by the computer system, for each identified key term, a frequency of occurrence and location within the data files;
    generating, by the computer system, knowledge units from the data files based on the determined frequencies of occurrence and the determined locations of the key terms in the data files;
    selecting, by computing system, a knowledge unit from the generated knowledge units for extraction of n-grams;
    deriving, by the computing system, a term vector for the knowledge unit based at least on the determined frequencies of occurrence and the determined locations of the key terms in the knowledge unit;
    identifying, by the computing system, the key terms in the term vector based at least on the frequency of occurrence of each key term in the knowledge unit;
    extracting, by the computing system, n-grams using the key terms in the term vector;
    scoring, by the computing system, each of the extracted n-grams as a function of at least a frequency of occurrence of each of the n-grams across the knowledge corpus of the enterprise; and
    adding, by the computing system, one or more of the extracted n-grams to an index based on the scoring.

2. The method of claim 1, wherein the deriving the term vector includes
    modeling the key terms identified in the knowledge unit as the term vector, and
    wherein a value for each key term in the term vector is calculated as a function of at least the frequency of occurrence of the key term and the position of each occurrence of the key term in the knowledge unit.

3. The method of claim 2, wherein the deriving the term vector further includes performing natural language processing on the key terms in the knowledge unit, and filtering the key terms in the knowledge unit based on the natural language processing.

4. The method of claim 1, wherein the extracting the one or more n-grams using the identified key terms includes:
    identifying one or more terms adjacent to each key term in the knowledge unit;
    performing natural language processing on the one or more terms adjacent to each key term and the key terms;
    calculating a probability of the one or more terms adjacent to each key term in the knowledge unit as preceding or following the key term based on a function of the natural language processing;
    when the probability of the one or more terms being adjacent to the key term is greater than minimum threshold probability, extracting an n-gram comprising the one or more terms and the key term; and
    when the probability of the one or more terms being adjacent to the key term is less than the minimum threshold probability, extracting an n-gram comprising only the key term.

5. The method of claim 4, wherein the calculating the probability of the one or more terms adjacent to each key term as preceding or following the key term in the knowledge unit as preceding or following the key term is based on the function of the natural language processing and a frequency of occurrence of the one or more terms adjacent to each key term.

6. The method of claim 1, wherein the scoring each of the extracted n-grams is a function of the frequency of occurrence of the n-gram, a recency of the n-gram, and a commonality of the n-gram across the knowledge corpus of the enterprise.

7. The method of claim 1, wherein the adding the one or more of the extracted n-grams to the index includes:
    determining a total number of n-grams extracted for the knowledge unit;

determining a top percentage of the n-grams; and
adding the top percentage of the n-grams to the index.

8. The method of claim 1, wherein the adding the one or more of the extracted n-grams to the index includes:
setting a minimum threshold score;
determining whether the score for each of the extracted n-grams is above the minimum threshold score; and
when the score for an n-gram is above the minimum threshold score, adding the n-gram to the index.

9. The method of claim 1, wherein the index is a corporate dictionary comprising a set of n-grams that identify each knowledge unit within the knowledge corpus of the enterprise, and the set of n-grams comprises the one or more of the extracted n-grams added to the index.

10. A non-transitory computer-readable storage memory storing a plurality of instructions executable by one or more processors, the plurality of instructions comprising:
instructions that cause the one or more processors to obtain data files from a knowledge corpus of an enterprise;
instructions that cause the one or more processors to identify key terms within the data files;
instructions that cause the one or more processors to determine, for each identified key term, a frequency of occurrence and location within the data files;
instructions that cause the one or more processors to generate knowledge units from the data files based on the determined frequencies of occurrence and the determined locations of the key terms in the data files;
instructions that cause the one or more processors to select a knowledge unit from the generated knowledge units for extraction of n-grams;
instructions that cause the one or more processors to derive a term vector comprising terms in the knowledge unit based at least on the determined frequencies of occurrence and the determined locations of the key terms in the knowledge unit;
instructions that cause the one or more processors to identify the key terms in the term vector based at least on the frequency of occurrence of each key term in the knowledge unit;
instructions that cause the one or more processors to calculate a probability of one or more terms adjacent to each key term in the knowledge unit as preceding or following the key term based on a function of natural language processing;
instructions that cause the one or more processors to extract an n-gram comprising the one or more terms and the key term when the probability of the one or more terms being adjacent to the key term is greater than a minimum threshold probability;
instructions that cause the one or more processors to extract an n-gram comprising only the key term when the probability of the one or more terms being adjacent to the key term is less than the minimum threshold probability;
instructions that cause the one or more processors to score each of the extracted n-grams as a function of at least a frequency of occurrence of each of the n-grams across the knowledge corpus of the enterprise; and
instructions that cause the one or more processors to add one or more of the extracted n-grams to an index based on the scoring.

11. The non-transitory computer-readable storage memory of claim 10, wherein the plurality of instructions further comprise:
instructions that cause the one or more processors to model the key terms identified in the knowledge unit as the term vector; and
wherein a value for each key term in the term vector is calculated as a function of at least the frequency of occurrence of the term and the position of each occurrence of the key term in the knowledge unit.

12. The non-transitory computer-readable storage memory of claim 11, wherein the plurality of instructions further comprise:
instructions that cause the one or more processors to perform natural language processing on the key terms in the knowledge unit; and
instructions that cause the one or more processors to filter the key terms in the knowledge unit based on the natural language processing.

13. The non-transitory computer-readable storage memory of claim 10, wherein the calculating the probability of the one or more terms adjacent to each key term as preceding or following the key term in the knowledge unit as preceding or following the key term is based on the function of the natural language processing and a frequency of occurrence of the one or more terms adjacent to each key term.

14. The non-transitory computer-readable storage memory of claim 10, wherein the scoring each of the extracted n-grams is a function of the frequency of occurrence of the n-gram, a recency of the n-gram, and a commonality of the n-gram across the knowledge corpus of the enterprise.

15. The non-transitory computer-readable storage memory of claim 10, wherein the adding the one or more of the extracted n-grams to the index includes:
determining a total number of n-grams extracted for the knowledge unit;
determining a top percentage of the n-grams; and
adding the top percentage of the n-grams to the index.

16. The non-transitory computer-readable storage memory of claim 10, wherein the adding the one or more of the extracted n-grams to the index includes:
setting a minimum threshold score;
determining whether the score for each of the extracted n-grams is above the minimum threshold score; and
when the score for an n-gram is above the minimum threshold score, adding the n-gram to the index.

17. The non-transitory computer-readable storage memory of claim 10, wherein the index is a corporate dictionary comprising a set of n-grams that identify each knowledge unit within the knowledge corpus of the enterprise, and the set of n-grams comprises the one or more of the extracted n-grams added to the index.

18. A system comprising:
one or more processors; and
a memory coupled with and readable by the one or more processors, the memory configured to store a set of instructions which, when executed by the one or more processors, causes the one or more processors to:
obtain data files from a knowledge corpus of an enterprise;
identify key terms within the data files;
determine, for each identified key term, a frequency of occurrence and location within the data files;
generate knowledge units from the data files based on the determined frequencies of occurrence and the determined locations of the key terms in the data files;

select a knowledge unit from the generated knowledge units;
identify one or more knowledge units from the knowledge units that are similar to the selected knowledge unit;
combine the identified one or more knowledge units and the selected knowledge unit into a knowledge pack;
select a knowledge unit or the knowledge pack for extraction of n-grams;
derive a term vector comprising terms in the knowledge unit or the knowledge pack based at least on the determined frequencies of occurrence and the determined locations of the key terms in the knowledge unit or the knowledge pack;
identify the key terms in the term vector based at least on a frequency of occurrence of each key term in the knowledge unit or the knowledge pack;
extract n-grams using the identified key terms in the term vector;
score each of the extracted n-grams as a function of at least a frequency of occurrence of each of the n-grams across the knowledge corpus of the enterprise; and
add one or more of the extracted n-grams to an index based on the scoring.

19. The system of claim 18, wherein the extracting the one or more n-grams using the identified key terms includes:
identifying one or more terms adjacent to each key term in the knowledge unit or the knowledge pack;
performing natural language processing on the one or more terms adjacent to each key term and the key terms;
calculating a probability of the one or more terms adjacent to each key term in the knowledge unit or the knowledge pack as preceding or following the key term based on a function of the natural language processing;
when the probability of the one or more terms being adjacent to the key term is greater than minimum threshold probability, extracting an n-gram comprising the one or more terms and the key term; and
when the probability of the one or more terms being adjacent to the key term is less than the minimum threshold probability, extracting an n-gram comprising only the key term.

20. The system of claim 18, wherein the one or more processors are further caused to provide an interface through which a user can interact with the index, the interface including links to the knowledge unit or the knowledge pack that includes the key terms for the one or more n-grams added to the index.

* * * * *